United States Patent
Swint et al.

(10) Patent No.: US 11,170,271 B2
(45) Date of Patent: *Nov. 9, 2021

(54) METHOD AND SYSTEM FOR CLASSIFYING CONTENT USING SCORING FOR IDENTIFYING PSYCHOLOGICAL FACTORS EMPLOYED BY CONSUMERS TO TAKE ACTION

(71) Applicant: Dallas Limetree, LLC, Dallas, TX (US)

(72) Inventors: Galen S. Swint, Dallas, TX (US); Steven T. Archer, Dallas, TX (US); Thomas Rouse, Dallas, TX (US); Michael T. Meadows, Dallas, TX (US)

(73) Assignee: Dallas Limetree, LLC, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/453,720

(22) Filed: Jun. 26, 2019

(65) Prior Publication Data

US 2020/0410302 A1 Dec. 31, 2020

(51) Int. Cl.
*G06K 9/62* (2006.01)

(52) U.S. Cl.
CPC ........... *G06K 9/6292* (2013.01); *G06K 9/629* (2013.01); *G06K 9/6256* (2013.01); *G06K 9/6269* (2013.01)

(58) Field of Classification Search
CPC .... G06K 9/6292; G06K 9/629; G06K 9/6269; G06K 9/6256
See application file for complete search history.

(56) References Cited

U.S. PATENT DOCUMENTS

| | | | | |
|---|---|---|---|---|
| 8,391,611 | B2* | 3/2013 | Engtrom | G06F 16/58 |
| | | | | 382/197 |
| 9,087,297 | B1* | 7/2015 | Filippova | G06K 9/00718 |
| 9,355,312 | B2* | 5/2016 | Amtrup | G06K 9/00456 |
| 9,465,987 | B1* | 10/2016 | Bell | G06K 9/00798 |
| 9,576,196 | B1* | 2/2017 | Natarajan | G06K 9/3258 |
| 10,262,239 | B2* | 4/2019 | Polak | G06K 9/4604 |
| 10,319,035 | B2* | 6/2019 | Nelson | G06Q 40/08 |
| 10,445,580 | B2* | 10/2019 | Matsumoto | G06T 11/60 |
| 2003/0101181 | A1* | 5/2003 | Al-Kofahi | G06K 9/6292 |

(Continued)

*Primary Examiner* — Solomon G Bezuayehu
(74) *Attorney, Agent, or Firm* — Ferguson Braswell Fraser Kubasta PC

(57) ABSTRACT

Methods and systems classify content using scoring for identifying psychological factors employed by consumers to take action. An interface module obtains content including one or more elements. One or more feature vectors are extracted from the content. The one or more feature vectors include a feature vector that identifies an element of the one or more elements of the content. A classification scoring module generates one or more classification vectors from the one or more feature vectors. The one or more classification vectors include a classification vector that identifies one or more characteristics of the element from the content. The one or more classification vectors are combined and one or more characteristics of the content are identified to form an aggregated vector. A goal of the content is detected by generating a string that describes the content from the aggregated vector. The goal is presented with the content.

17 Claims, 13 Drawing Sheets

(56) References Cited

U.S. PATENT DOCUMENTS

| | | | | |
|---|---|---|---|---|
| 2008/0123907 A1* | 5/2008 | Eura | ............... | G06K 9/00288 |
| | | | | 382/118 |
| 2010/0060736 A1* | 3/2010 | Shi | ............... | G06K 9/00832 |
| | | | | 348/148 |
| 2012/0269441 A1* | 10/2012 | Marchesotti | ......... | G06K 9/6269 |
| | | | | 382/195 |
| 2013/0129307 A1* | 5/2013 | Choe | ............... | A63F 13/48 |
| | | | | 386/227 |
| 2013/0259390 A1* | 10/2013 | Dunlop | ............ | G06K 9/00751 |
| | | | | 382/224 |
| 2016/0004911 A1* | 1/2016 | Cheng | ............ | H04N 21/44008 |
| | | | | 382/159 |
| 2017/0295404 A1* | 10/2017 | Meredith | ............ | H04H 60/33 |
| 2020/0082850 A1* | 3/2020 | He | ............... | H04N 5/765 |
| 2020/0137463 A1* | 4/2020 | Kumar | ............... | G06N 3/088 |
| 2020/0410303 A1* | 12/2020 | Swint | ............... | G06K 9/6256 |

\* cited by examiner

METHOD AND SYSTEM FOR CLASSIFYING CONTENT USING SCORING FOR IDENTIFYING PSYCHOLOGICAL FACTORS EMPLOYED BY CONSUMERS TO TAKE ACTION

BACKGROUND

Consumers forming judgments and making decisions are influenced by psychological factors including psychological approach, their motivations, emotions, goal-setting, heuristics, and cognitive biases. Creative content (including images, video, audio, and text) that is consumed by consumers triggers such factors based on the characteristics encoded or embedded in the creative via elements and features of the media content. Machine learning algorithms identify features found in media, but do not identify the characteristics for the psychological factors that are triggered by the content.

SUMMARY

In general, in one aspect, one or more embodiments relate to a method for classifying content using scoring. An interface module obtains content comprising one or more elements. One or more feature vectors are extracted from the content. The one or more feature vectors comprise a feature vector that identifies an element of the one or more elements of the content. A classification scoring module generates one or more classification vectors from the one or more feature vectors. The one or more classification vectors comprise a classification vector that identifies one or more characteristics of the element from the content. The one or more classification vectors are combined and one or more characteristics of the content are identified to form an aggregated vector. A goal of the content is detected by generating a string that describes the content from the aggregated vector. The goal is presented with the content.

In general, in one aspect, one or more embodiments relate to a server system that comprises a processor and a memory coupled to the processor. The memory comprises an application that executes on the processor, uses the memory, and is configured for classifying content using scoring. Received through an interface module, content is obtained that comprises one or more elements. With an extraction module, one or more feature vectors are extracted from the content. The one or more feature vectors comprise a feature vector identifying an element of the one or more elements of the content. Using a classification scoring module, one or more classification vectors are generated from the one or more feature vectors. The one or more classification vectors comprise a classification vector that identifies one or more characteristics of the element from the content. The one or more classification vectors are combined and one or more characteristics of the content are identified to form an aggregated vector. A goal of the content is detected by generating a string that describes the content from the aggregated vector. The goal is presented with the content.

In general, in one aspect, one or more embodiments relate to a method executed with a client device comprising a graphical user interface. Through the graphical user interface, content is received that comprises one or more elements. One or more feature vectors extracted from the content are obtained. The one or more feature vectors comprise a feature vector identifying an element of the one or more elements of the content. One or more classification vectors generated from the one or more feature vectors are obtained. The one or more classification vectors comprise a classification vector identifying one or more characteristics of the element from the content. An aggregated vector formed by combining the one or more classification vectors and identifying one or more characteristics of the content is obtained. A goal of the content detected by generating a string that describes the content from the aggregated vector is obtained. The goal is displayed with the content.

Other aspects of the disclosure will be apparent from the following description and the appended claims.

DETAILED DESCRIPTION

Figure 1:
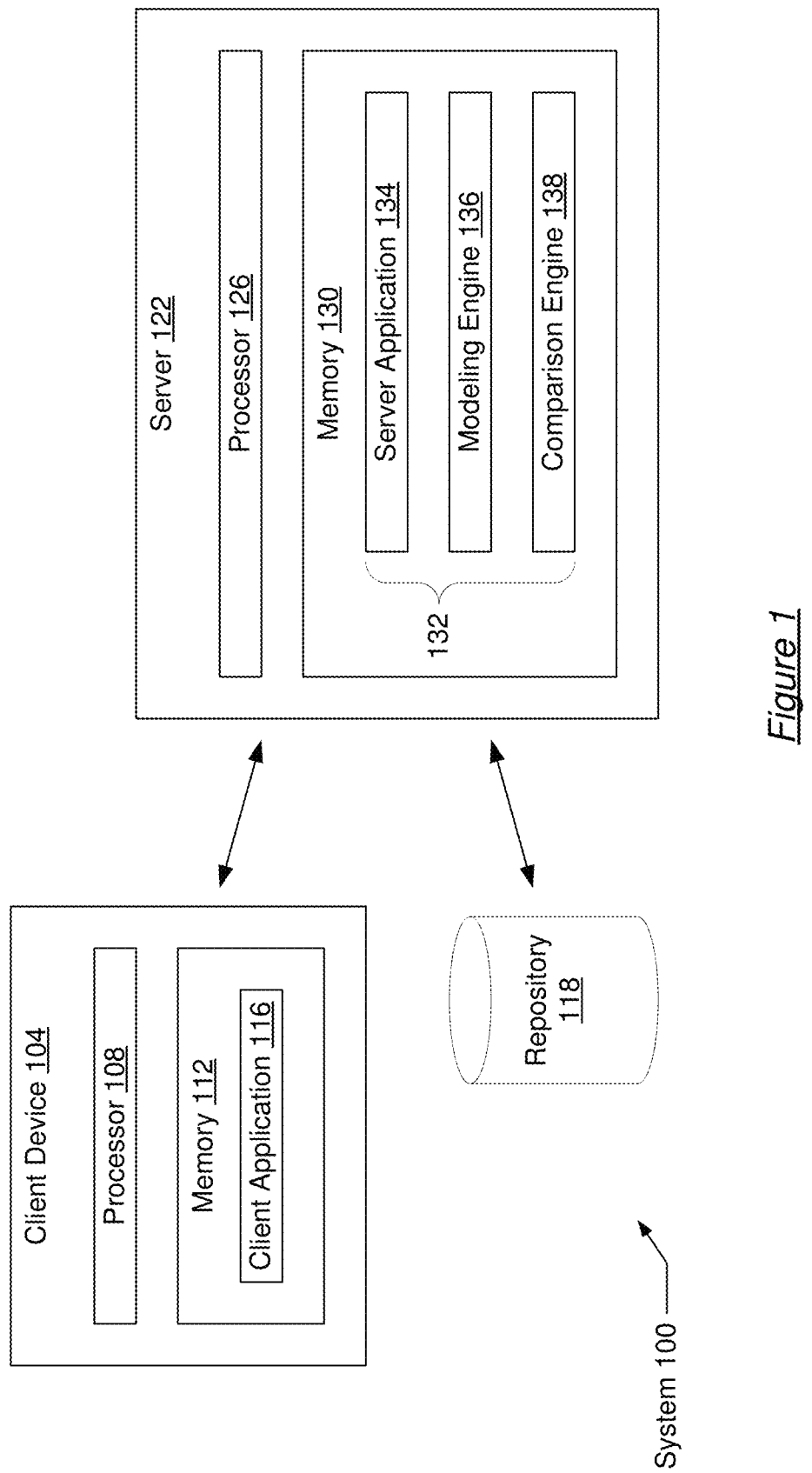
FIG. 1, FIG. 2, and FIG. 3 show diagrams of systems in accordance with disclosed embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, the characteristics of creative content are analyzed, displayed, and revised by the system. The characteristics are psychological factors that may include the motivation and approach that are associated with the content. The content includes one or more elements, such as images of objects, words, phrases, etc. The system extracts features that identify the elements of the content with feature vectors. The feature vectors are analyzed to identify the characteristics of the elements of the content with classification vectors. The classification vectors are combined to create an aggregate vector that identifies the characteristics and psychological factors of the content. The system further analyzes the characteristics detected from the content against selected characteristics to identify elements to add to or remove from the content to increase or decrease the detection of the selected characteristics.

FIG. 1 shows a diagram of embodiments that are in accordance with the disclosure. The various elements, systems, and components shown in FIG. 1 may be omitted, repeated, combined, and/or altered as shown from FIG. 1. Accordingly, the scope of the present disclosure should not be considered limited to the specific arrangements shown in FIG. 1.

The system (100) classifies content using scoring. The system (100) includes the client device (104), the repository (118), and the server (122).

The client device (104) is one or more computing devices in accordance with the computing system (1400) and the nodes (1422) and (1424) described below in FIGS. 14A and 14B. The client device (104) includes the memory (112) and processor (108) that execute and store applications to access the server (122) and present results. In one or more embodiments, the client device (104) is multiple client devices that access the server (122).

The processor (108) executes the programs in the memory (112). In one or more embodiments, the processor (108) is multiple processors that execute programs and communicate with the server (122).

The memory (112) stores data and programs that are used and executed by the processor (108). In one or more embodiments, the memory (112) is multiple memories that store data and programs that are used and executed by the processor (108). The memory (112) includes the client application (116). The client application (116) may be stored and executed on different memories and processors within the client devices (102).

The client application (116) includes one or more applications formed from one or more programs of the client device (104) that are executed by the processor (108) and stored in the memory (112). In one or more embodiments, the programs are written in languages, including one or more of: assembly language, ANSI C, C++, Python, Java, JavaScript, extensible markup language (XML), hypertext markup language (HTML), cascading style sheets (CSS), Structured Query Language (SQL), Predictive Modeling Markup Language (PMML), etc. In one or more embodiments, the client application (116) in the memory (112) executes on the processor (108) of the client device (104) to access the server application (134) of the server (122).

As an example, the client application (116) may be a web browser that accesses a web page that is hosted by the server (122) using the server application (134). In another example, the client application (116) is a web service that communicates with the server application (134) using a representational state transfer application programming interface (RESTful API).

In one or more embodiments, the repository (118) is a computing system that may include multiple computing devices in accordance with the computing system (1400) and the nodes (1422) and (1424) described below in FIGS. 14A and 14B. The repository (118) may be hosted using Microsoft Azure Data Services, Amazon Web Services (AWS) S3 cloud storage, Google Cloud Storage, etc. The data in the repository (118) includes one or more creative content (also known as "creative" and as "content"), analytical models, classification examples, training data, source code, executable code, etc. The data in the repository (108) may be processed by programs executing on the server (122) as described below. In one or more embodiments, the repository (118) is hosted within the same cloud services as the server (122).

The creative content is content that includes one or more characteristics, which may include a motivation and an approach and is further discussed below. Types of content include images, videos, audio, text, etc.

The server (122) is a computing device in accordance with the computing system (1400) and the nodes (1422) and (1424) described below in FIGS. 14A and 14B. The server (122) includes the memory (130) and the processor (126) that store and execute applications that provide services to the client applications of the client device (104). In one or more embodiments, the server (122) is multiple servers that respond to requests from the client device (104).

The processor (126) executes the programs in the memory (130). In one or more embodiments, the processor (126) is multiple processors that execute the programs (132) and communicate with the client device (104).

The memory (130) stores data and programs that are used and executed by the processor (126). The memory (130) includes the programs (132). The programs (132) may be stored and executed on different memories, processors, and servers of the system (100).

In one or more embodiments, the programs (132) include the server application (134), the modeling engine (136), and the comparison engine (138). The server application (134) is a program that responds to the requests from client applications of the client device (104) using data from other programs, including the modeling engine (136) and the comparison engine (138).

The modeling engine (136) is a program that analyzes the content using an analytical model and updates the analytical model based on feedback. The analytical model includes one or more machine learning algorithms, takes creative content as input, and outputs an aggregated vector that identifies one or more characteristics that are from the creative content. In one or more embodiments, the analytical model of the modeling engine is updated based on feedback that is received from a user of the system (100).

The comparison engine (138) is a program that compares the characteristics identified in an aggregated vector to one or more selected vectors that identify one or more characteristics. In one or more embodiments, the comparison engine (138) takes the aggregated vector and a selection vector as inputs and outputs one or more suggestions for adjusting the aggregated vector to be closer to the characteristics identified in the selection vector, which is discussed further below.

Figure 2:
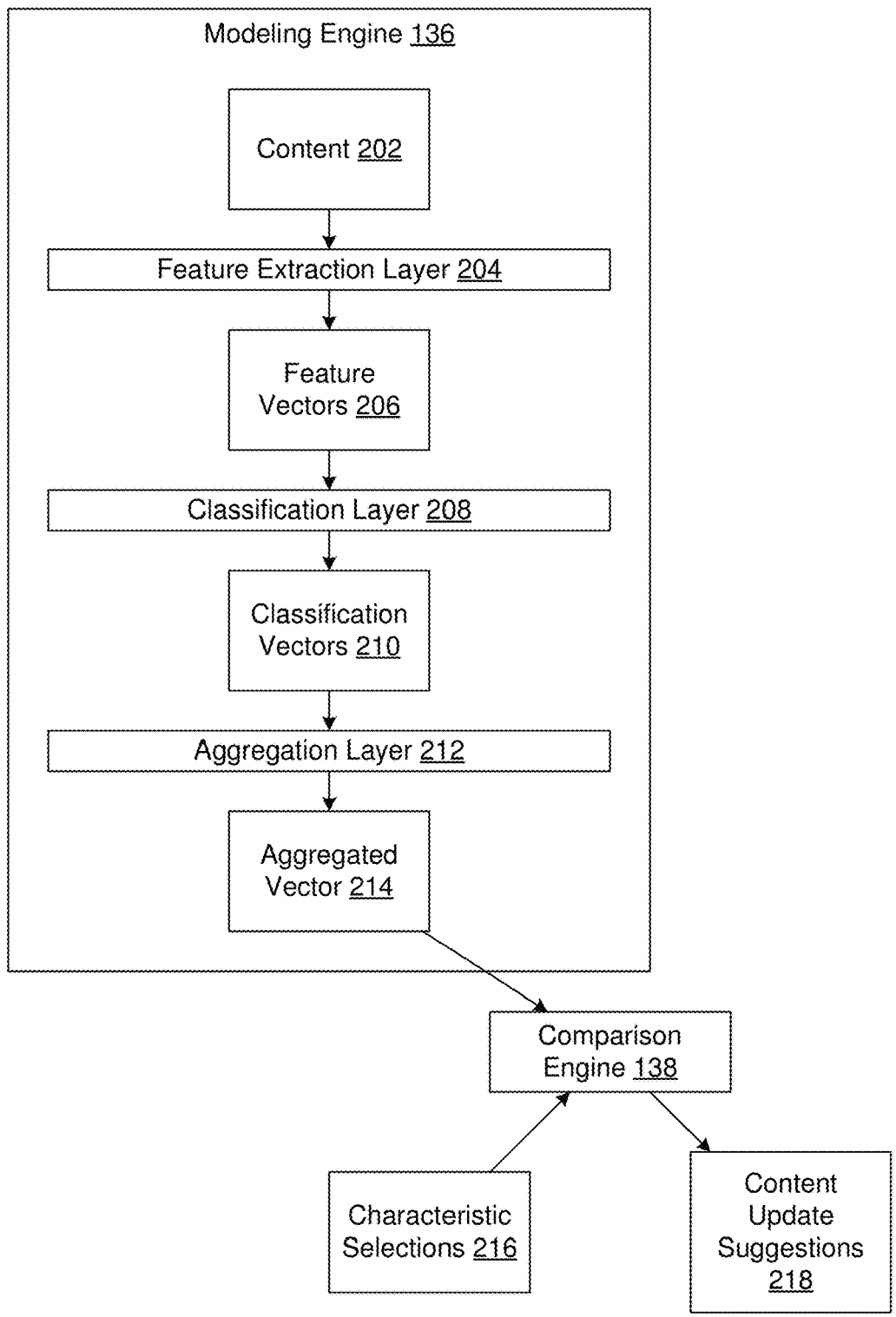

FIG. 2 shows a diagram of embodiments that are in accordance with the disclosure. FIG. 2 further describes examples of the modeling engine (136) and the comparison engine (138) from FIG. 1. The various elements, systems, and components shown in FIG. 2 may be omitted, repeated, combined, and/or altered as shown from FIG. 2. Accordingly, the scope of the present disclosure should not be considered limited to the specific arrangements shown in FIG. 2.

In one or more embodiments, the modeling engine (136) processes data using multiple layers. The data may include the content (202), the feature vectors (206), the classification vectors (210), and the aggregated vector (214). The layers may include the feature extraction layer (204), the classification layer (208), and the aggregation layer (212).

The content (202) is creative content that is also known as "creative". The content (202) may be one of a number of types, including: images, videos, audio, text, etc. and may include text, visual, and audio elements. The text elements may be in one or more languages and include one or more words, phrases, and slogans that are included with or embedded into the content (202). The visual elements may include one or more objects depicted within the content (202). The audible elements may include musical figures, phrases, and melodies along with speech and utterances of one or more languages. The content (202) is stored using one or more file types, including hypertext markup language (HTML) files, cascading style sheet (CSS) files, extensible markup language (XML) files, webm media files, joint photographic experts group (JPEG) files, portable network graphic (PNG) files, WAV audio files, moving picture experts group (MPEG) files, etc. In one or more embodiments, the content (202) is sent or streamed as a file with a web browser and is received by a server that processes the content with the modeling engine (136).

The feature vectors (206) are the features extracted from the content (202) by the feature extraction layer (204) that correspond to the elements of the content (202). In one or more embodiments, the features may include one or more text, visual, and audio features that identify the text, visual, and audio elements from the content (202). In one or more embodiments, a feature vector is a one hot vector with a number of dimensions equal to the number of different elements that can be recognized from the content (202).

The classification vectors (210) score characteristics from the feature vectors (206) for the elements within the content (202). In one or more embodiments, a classification vector includes a set of dimensions that identify multiple types of characteristics and several dimensions of interest are possible to evaluate the characteristics associated with the content (202). Characteristics may include but are not limited to goals, motivations, approaches, and cognitive heuristics. A goal may be something a consumer of a product or service wishes to accomplish. Goals may be numerous and overlapping. Motivations relate to the emotional impetus of a consumer that views the content (202). In one or more embodiments, motivations include the nine characteristics of: achievement, autonomy, belonging, competence, empowerment, engagement, esteem, nurturance, and security.

Additional characteristics of interest include the approach, i.e., whether a motivation is pursued with respect to actively achieving a positive outcome or avoiding a negative outcome. Typical terminology for the approach of achieving positive outcome, are terms such as "promotion," "maximization," or "optimism". Negative outcome avoidance terms may include "avoidance," "satisfactory," "caution," or "prevention."

Cognitive heuristics are mental shortcuts that a consumer may employ, consciously or unconsciously, to drive towards taking an action. Heuristics are numerous and may comprise notions such as a "scarcity effect," where a deal or item is limited in supply or time (e.g., "for the first 100 customers"), "decoy effect," in which a good or offer may be associated with an action indirectly (e.g., "10% of profit goes to charity"), "availability bias," in which a consumer compares information because it is easy and "there" not necessarily because it is rigorously collected and vetted (e.g., the common "good," "better," "best" strategy in which a store provides three feature levels that steer consumers towards a middle level), "confirmation bias" in which a consumer is looking to re-affirm a prior decision, or the "identifiable victim effect" in which a consumer strongly identifies a particular victim or potential victim of a negative outcome with little or no regard to the actual likelihood of the odds said victim will in fact be affected by the identified negative outcome.

In one or more embodiments, the characteristics of motivation and approach are combined into a classification vector with eighteen (18) dimensions to encompass the eighteen (18) combinations of the nine (9) motivations with the two (2) approaches. Additional embodiments may use the same or different characteristics with the same or different dimensions to form the classification vectors (210).

The aggregated vector (214) is a score that identifies the combined characteristics of the classification vectors (210) generated from the feature vectors (206) for the content (202). In one or more embodiments, the aggregated vector (214) includes the same number of dimensions as one of the classification vectors (210) and the same meaning for each dimension. As an example, the classification vectors (210) may have the same eighteen (18) dimensions as the classification vectors (210), as described above.

The feature extraction layer (204) is a set of programs that generate the feature vectors (206) from the content (202). In one or more embodiments, the feature extraction layer (204) applies one or more machine learning algorithms to the content (202). For example, the feature extraction layer (204) may include one or more neural networks (e.g., fully connected neural networks, convolutional neural networks (CNNs), recurrent neural networks (RNNs), long short term memories (LSTMs), etc.) to process the content (202) and generate the feature vectors (206). In one or more embodiments, the feature extraction layer (204) is a feature extraction service from a third party that is accessed using a representational state transfer (REST) application programming interface (API) to send the content (202) and receive the feature vectors (206). In one or more embodiments, the feature extraction service may identify elements from the content (202) with strings that are then converted to the feature vectors (206). The feature extraction layer (204) may include separate algorithms for the different types of the content (202) and the different types of elements within the content (202).

The classification layer (208) is a set of programs that score the feature vectors (206) from the content (202) to generate the classification vectors (210). In one or more embodiments, the classification layer (208) assigns the classification vectors (210) to the feature vectors (206) using one or more algorithms. For example, the classification vectors (210) may be assigned to the feature vectors (206) using a look up table. Additionally, one or more machine learning algorithms may be trained and used to generate the classification vectors (210) from one or more of the content (202) and the feature vectors (206).

The aggregation layer (212) of the modeling engine (136) combines the classification vectors (210) generated in response to the content (202) to create the aggregated vector (214). One or more numeric or machine learning algorithms may be trained and used to generate the aggregated vector (214) from one or more of the content (202), the feature vectors (206), and the classification vectors (210). In one or more embodiments, the aggregation layer (212) combines the classification vectors (208) by one or more of weighting, averaging, adding, and normalizing the classification vectors (208).

The characteristic selections (216) identify one or more characteristics that are sought in the content (202) and should be detected with the aggregated vector (214). In one or more embodiments, a characteristic selection identifies one or more of a goal, a motivation, an approach, a cognitive heuristic, etc. For example, a characteristic selection may identify one of the eighteen (18) dimensions of one of the classification vectors (210) describe above.

The content update suggestions (218) are generated by the comparison engine (138). In one or more embodiments, content update suggestions identify one or more elements that are to be added to or removed form the content (202) to adjust the aggregated vector (214) that was derived from the content (202) to be closer to the characteristic selections (216). For example, a content update suggestion may identify a visual feature from the content (202) that should be removed from the content (202) or identify a text feature that should be added to the content (202) to improve the values of the dimensions of the aggregated vector (214) that are identified by the characteristic selections (216).

The comparison engine (138) compares the aggregated vector (214) to the characteristic selections (216) to generate the content update suggestions (218). In one or more embodiments, the comparison engine (138) uses a distance algorithm to compare the aggregated vector (214) to characteristic selections (216) and identify the content update suggestions (218), which is further described below.

Figure 3:
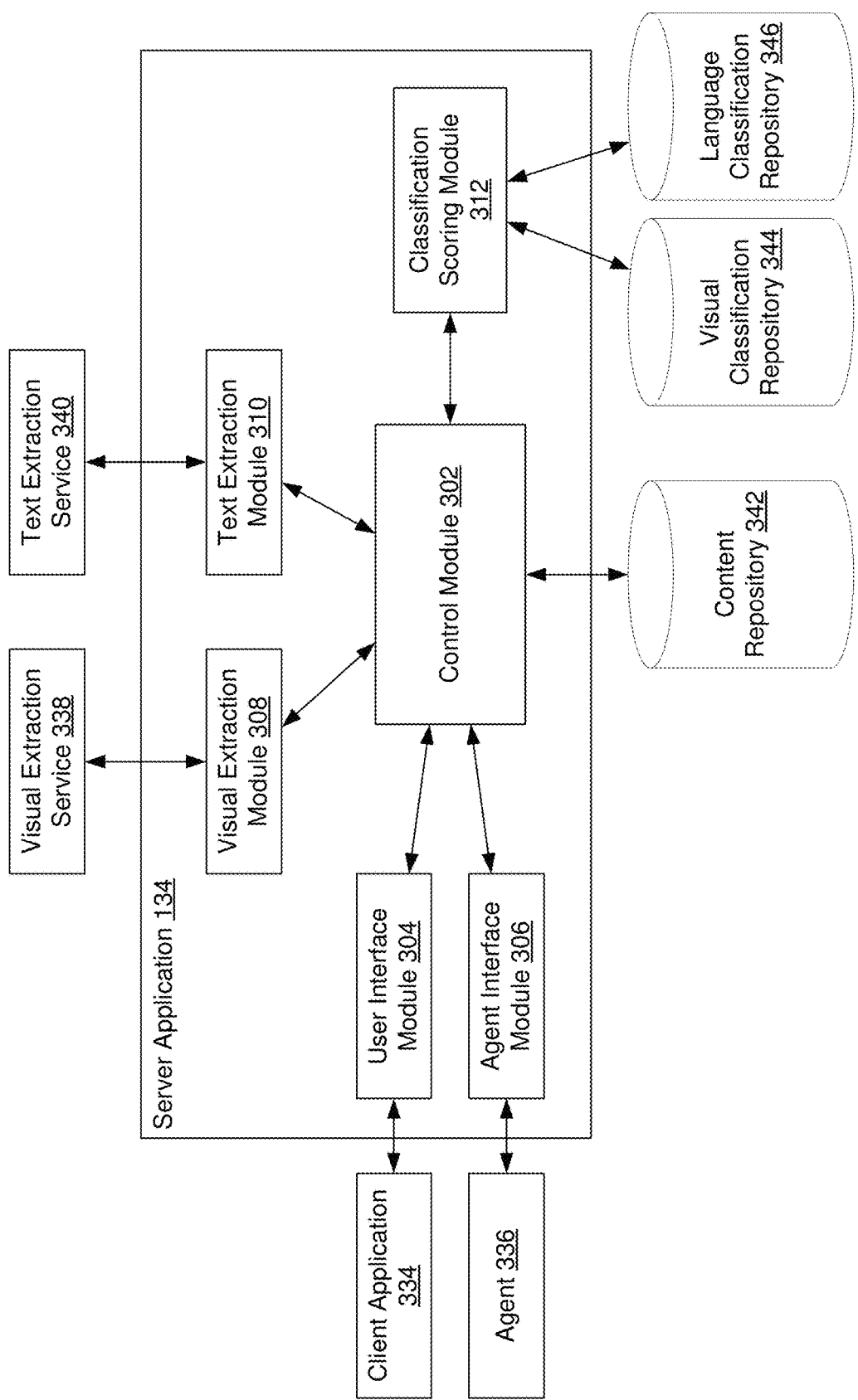

FIG. 3 shows a diagram of embodiments that are in accordance with the disclosure for classifying content using scoring with additional description for the server application (134) from FIG. 1. The various elements, systems, and components shown in FIG. 3 may be omitted, repeated, combined, and/or altered as shown from FIG. 3. Accordingly, the scope of the present disclosure should not be considered limited to the specific arrangements shown in FIG. 3.

The server application (134) is a set of programs that classifies content using scoring. The server application (134) includes modules to perform the operations of the server application (134). In one or more embodiments, the modules of the server application (134) include the control module (302), the user interface module (304), the agent interface module (306), the visual extraction module (308), the text extraction module (310), and the classification scoring module (312). The server application (134) communicates with the client application (334), the agent (336), the visual extraction service (338), and the text extraction service (340) utilizing the user interface module (304), the agent interface module (306), the visual extraction module (308), and the text extraction module (310), respectively. The server application (134) interacts the content repository (342) through the control module (302) and interacts with the visual classification repository (344) and the language classification repository (346) through the classification scoring module (312).

The control module (302) is a set of programs that control the operation of the server application (134). The control module (302) interacts with the other modules (306) through (312) and the content repository (342) to process content from the client application (334) and the agent (336), generate aggregated vectors and suggestions for updates, and present the vectors and suggestions to the client application (334) and the agent (336). The control module (302) communicates with the client application (334) through the user interface module (304) to receive content and present vectors and suggestions to a user of the client application (334). The control module (302) communicates with the agent (336) through the agent interface module (306) to receive content and present vectors and suggestions to the agent (336). The control module (302) communicates with the visual extraction service (338) through the visual extraction module (308) to send content to and receive features from the visual extraction service (338). The control module (302) communicates with the text extraction service (340) through the text extraction module (310) to send content to and receive features from the text extraction service (340). The control module (302) interacts with the classification scoring module (312) to send features extracted from the content to the classification scoring module (312) and to receive classification scores (in the form of classification vectors) from the classification scoring module (312).

The user interface module (304) is the interface used by the client application (334) to access the control module (302). In one or more embodiments, the user interface module (304) exposes a web API to the client application (334) for accessing the server application (134). In one or more embodiments, the user interface module (304) passes information back and forth between the client application (334) and the control module (302), including: the content, characteristic selections, etc. from the client application (334) and the vectors and suggestions from the control module (302).

The agent interface module (306) is the interface used by the agent (336) to access the control module (302). In one or more embodiments, the agent interface module (306) exposes a REST API to the agent (336) for accessing the server application (134). In one or more embodiments, the agent interface module (306) passes information back and forth between the agent (336) and the control module (302), including: the content, characteristic selections, etc. from the client application (334) and the vectors and suggestions from the control module (302).

The visual extraction module (308) is a set of programs that identify visual features within content, such as images and videos. In one or more embodiments, the visual extraction module (308) passes information between the control module (302) and the visual extraction service (338) including the content from the control module (302) and the features extracted from the content by the visual extraction service (338).

The text extraction module (310) is a set of programs that identify text features within content, such as text strings or text embedded within images and videos. In one or more embodiments, the text extraction module (310) passes information between the control module (302) and the text extraction service (340) including the content from the control module (302) and the features extracted from the content by the text extraction service (340).

The classification scoring module (312) is a set of programs that score the features found in the content. In one or more embodiments, the scouring module (312) generates the classification scores with information from one or more of the visual classification repository (344) and the language classification repository (346).

The client application (334) is a set of programs that interact with the server application (130). In one or more embodiments, the client application (334) is a web browser that accesses a web page hosted by the server application (130). The client application (334) may receive human user inputs that create content, select characteristics, and display the content, characteristics, vectors, and suggestions that are processed and generated by the system.

The agent (336) is a set of programs that interact with the server application (130). In one or more embodiments, the agent (336) is an application hosted by a server that accesses the server application (130) through a REST API. The agent (336) may create content, select characteristics, and present the content, characteristics, vectors, and suggestions that are processed and generated by the system.

The visual extraction service (338) is a set of programs that identify visual features within content. In one or more embodiments, the visual extraction service (338) is multiple services offered by multiple cloud service providers that are accessible to the server application (134).

The text extraction service (340) is a set of programs that identify text features within content. In one or more embodiments, the text extraction service (340) recognizes text within content, which may be an image. In one or more embodiments, the text extraction service (340) is multiple services offered by multiple cloud service providers that are accessible to the server application (134). Examples of text or visual extraction services include the Cloud Vision API from Google Cloud, computer vision API from Microsoft Cognitive Services, and Amazon Rekognition from Amazon Web Services (AWS).

The content repository (342) is a set of one or more programs that form a data store for the content analyzed by the system. The visual classification repository (344) is a set of one or more programs that form a data store for the classifications and scores of visual features analyzed by the system. The language classification repository (346) is a set of one or more programs that form a data store for the classifications and scores of text features analyzed by the system that may be in one or more languages. In one or more embodiments, the repositories (342), (344), and (346) include multiple services offered by multiple cloud service providers that are accessible to the server application (134). Examples of repositories include Google Cloud Storage, Microsoft Azure Storage, and AWS cloud storage services.

Figure 4:
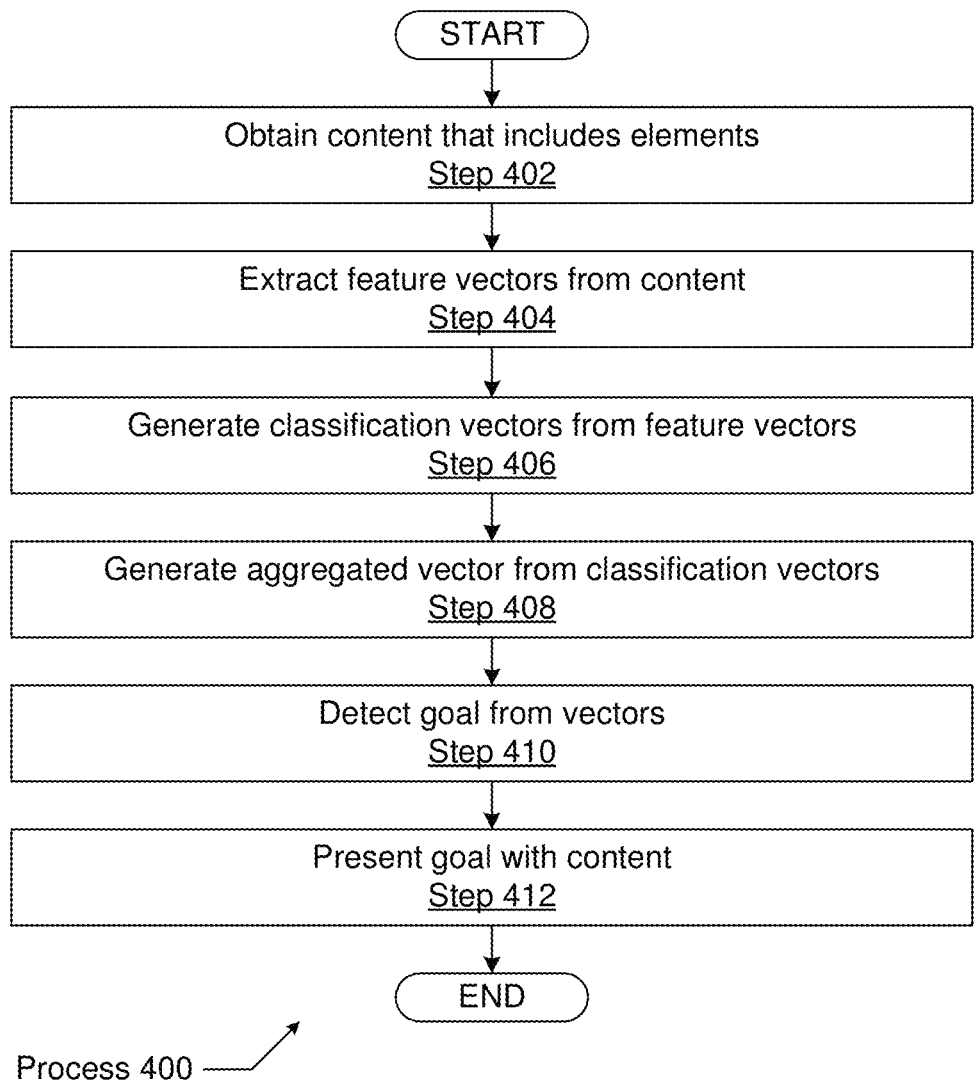
FIG. 4, FIG. 5, FIG. 6, FIG. 7, and FIG. 8 show flowcharts in accordance with disclosed embodiments.

FIG. 4 shows a flowchart of the process (400) in accordance with one or more embodiments of the disclosure for classifying content using scoring. While the various steps in the flowchart are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven in accordance with one or more embodiments. By way of an example, determination steps may not have a processor process an instruction unless an interrupt is received to signify that condition exists in accordance with one or more embodiments. As another example, determinations may be performed by performing a test, such as checking a data value to test whether the value is consistent with the tested condition in accordance with one or more embodiments.

In Step 402, content that includes elements is obtained. The content may be obtained by a client device and a server. In one or more embodiments, content is obtained by the client device in response to interaction between a user and a graphical user interface on the client device. The graphical user interface may allow the user to create the content with a client application. For example, the client application may be a web browser, which is used to identify one or more images from the client device that are used to form the content. Additionally, image creation and manipulation programs may be used to generate one or more images that are combined to form the content. The server may obtain the content by receiving the content from the client device with a server application. The server stores the content in a repository.

In Step 404, feature vectors are extracted from content. In one or more embodiments, the feature vectors are extracted by inputting the content into a feature extraction process that returns a set of one or more feature vectors that identify the elements within the content. In one or more embodiments, the feature extraction process includes one or more neural networks for the different types of elements within the content. The feature extraction process may include additional processes to unify the feature vectors of different types of elements. For example, an image may include visual elements and text elements that are identified with different types of feature vectors. A visual feature vector may be mapped to a text feature vector and vice versa so that other components and modules of the system may use feature vectors having the same number and types of dimensions.

In Step 406, classification vectors are generated from the feature vectors. In one or more embodiments, the classification vectors are the scores for the characteristics that are identifiable from the elements of the content that are identified with the feature vectors. In one or more embodiments, the classification vectors are generated by inputting a feature vector into a classification process that returns a set of one or more classification vectors that identify the characteristics of the element identified by the feature vector. The classification process may use one or more machine learning processes to generate the feature vectors and classify the elements from the content. Additional embodiments may map classification vectors to feature vectors using a look up table.

In Step 408, an aggregated vector is generated from the classification vectors. In one or more embodiments, the aggregated vector is generated with a combining process to which the classification vectors are input and the aggregated vector is output. As an example, the combining process may add the classification vectors and then normalize the resulting sum to form the aggregated vector. As another example, the combining process may take a weighted average of the classification vectors to form the aggregated vector with the weights determined using the feature vectors. One or more of the feature vectors may have user selected weights that are used to perform the weighted average.

In Step 410, a goal is detected from the vectors. The goal may be detected from one or more of the feature vectors, the classification vectors, and the aggregated vector. In one or more embodiments, the vectors are input to a goal detection process that outputs the goal as a string of text. One or more embodiments, the goal detection process uses a neural network to generate the string of text that identifies the goal detected from the vectors. For example, one or more of the aggregated vector, the classification vectors, and the feature vectors may be converted to text feature vectors (which may be word encoding vectors) that are then input to an LSTM. The LSTM generates an output sequence of text feature vectors. The output text feature vectors are then converted to the text string.

In Step 412, the goal and the content are presented. The presentation may include transmitting one or more of the goal and vectors generated by the system from the server to the client device and may include displaying one or more of the content, the goal, and the vectors with the client device to a user of the client device.

Figure 5:
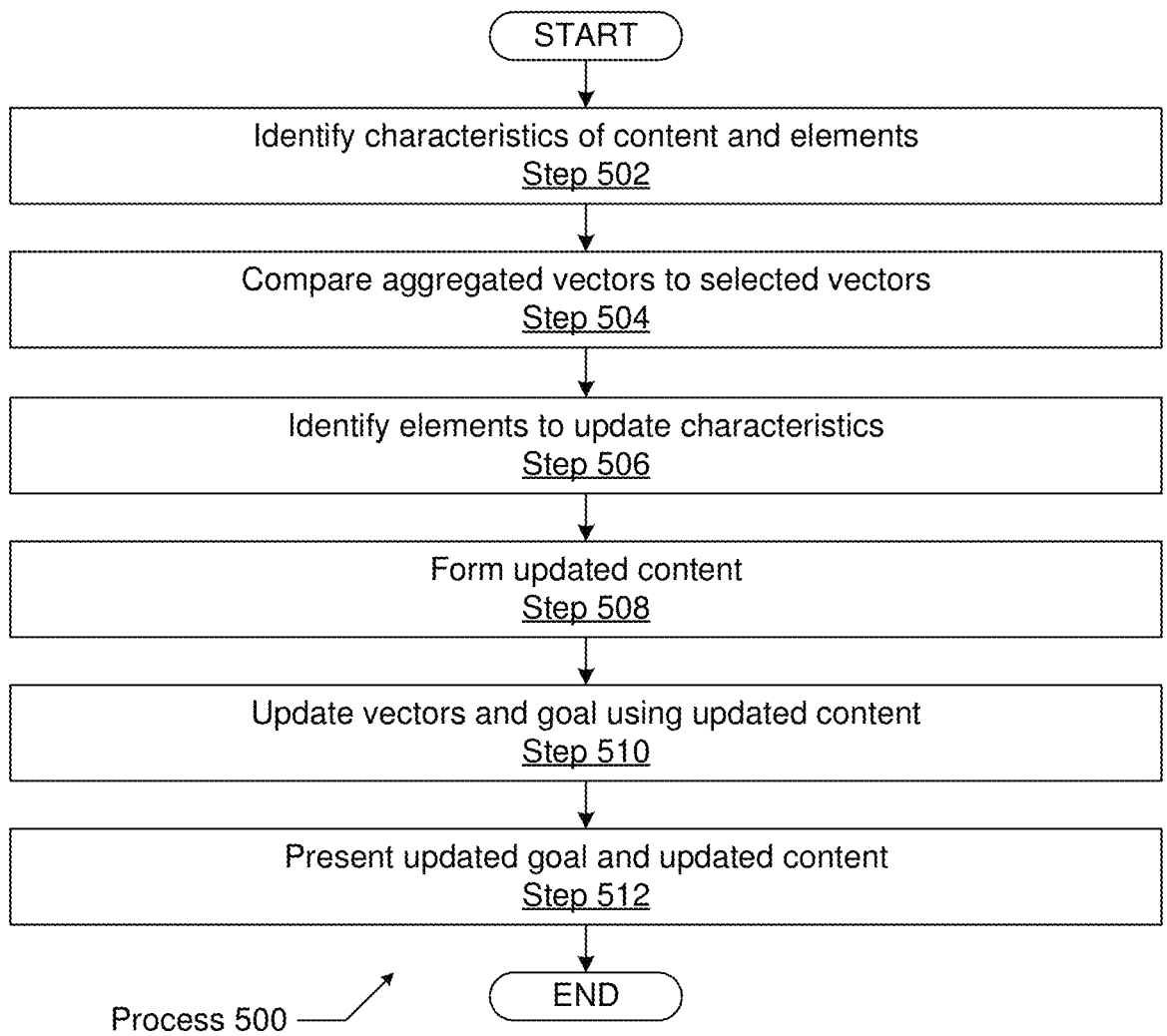

FIG. 5 shows a flowchart of the process (500) in accordance with one or more embodiments of the disclosure for classifying content using scoring. While the various blocks in the flowchart are presented and described sequentially, one of ordinary skill will appreciate that at least some of the blocks may be executed in different orders, may be combined or omitted, and at least some of the blocks may be executed in parallel. Furthermore, the blocks may be performed actively or passively. For example, some blocks may be performed using polling or be interrupt driven in accordance with one or more embodiments. By way of an example, determination blocks may not have a processor process an instruction unless an interrupt is received to signify that condition exists in accordance with one or more embodiments. As another example, determinations may be performed by performing a test, such as checking a data value to test whether the value is consistent with the tested condition in accordance with one or more embodiments.

In Step 502, characteristics of content and elements are identified. In one or more embodiments, the characteristics of the content and elements are identified as a motivation that is one of achievement, autonomy, belonging, competence, empowerment, engagement, esteem, nurturance, and security with a nine dimension one hot motivation classification vector. The characteristics of the content and elements may also be identified as an approach that is one of actively achieving a positive outcome (i.e., a positive approach) and avoiding a negative outcome (i.e., a negative approach) with a two dimension one hot approach classification vector. The motivations and approaches may be combined into an eighteen dimension one hot classification vector with each dimension identifying a pair of characteristics including one motivation and one approach.

In Step 504, aggregated vectors are compared to selected vectors. In one or more embodiments, an aggregated vector is compared to a selected vector to identify a characteristic of the content to update. The selected vector may be selected by a user. The user may select a motivation and approach pair of the aggregated vector that is to be adjusted by adding or removing elements from the content. For example, when a user selects to increase the pair of an engagement motivation with a positive approach, the user may identify and select the dimension from the aggregated vector that corresponds to the characteristic pair of an engagement motivation and a positive approach. In one or more embodiments, the user may select the dimension with a graphical user interface and select whether to increase or decrease the value of the characteristic dimension. In one or more embodiments, the selected vector that identifies the characteristics to adjust may have the same dimensions as the aggregated vector with a value of zero in dimensions that are not selected and a value of one in dimensions that are selected. The comparison may be performed by normalizing the aggregated vector and the selected vector, determining the Euclidean distance between the normalized aggregated sector and the normalized selected vector, and comparing the Euclidean distance to a threshold.

In Step 506, elements are identified to update characteristics. In one or more embodiments, text, visual, or audio elements are identified to be added to or removed from the content to adjust the characteristics identified with the selected vector. For example, an image of a family may be identified to be included within the content to increase the value of the dimension of the nurturance motivation paired with the positive approach. As another example, an image of a home may be identified to be removed from the content to decrease the value of the dimension of the nurturance motivation paired with the positive approach.

When the dimension corresponding to the selected vector (i.e., the selected dimension) is to be reduced, the elements currently within the content maybe ranked by their influence on the selected dimension. The influence of an element on the selected dimension is the value from the selected dimension from the classification vector that was generated from the feature vector that identified the element within the content. The system may present and display one or more of the elements to be removed that have the largest influence on the selected dimension.

When the selected dimension is to be increased, one or more classification repositories may be searched to identify elements that will generate classification vectors that have values above a threshold for the selected dimension. The identified elements to be added may be ranked by their influence on the selected dimension with the influence being the value of the selected dimension in the classification vectors generated from the identified elements.

In Step 508, the content is updated. In one or more embodiments, be content is updated by adding or removing elements to and from the content to form updated content. The elements to be added or removed were previously identified as influencing the dimensions associated with the selected characteristics, as described above.

In Step 510, the vectors and goal are updated using the updated content. In one or more embodiments, the updated content is analyzed in a similar fashion as the original content by extracting updated feature vectors from the updated content, generating updated classification vectors from the updated feature vectors, generating an updated aggregated vector from the updated classification vectors, and generating an updated detected goal from one or more of the updated content and the updated vectors. By changing the elements in the updated content the distance between updated aggregated vector and the selected vector is less than the distance between the original aggregated vector and the selected vector.

In Step 512, the updated goal and updated content are presented. In one or more embodiments, one or more of the updated goal, updated vectors, and updated content are presented by being transmitted from the server to the client device and by being displayed by the client device to a user.

Figure 6:
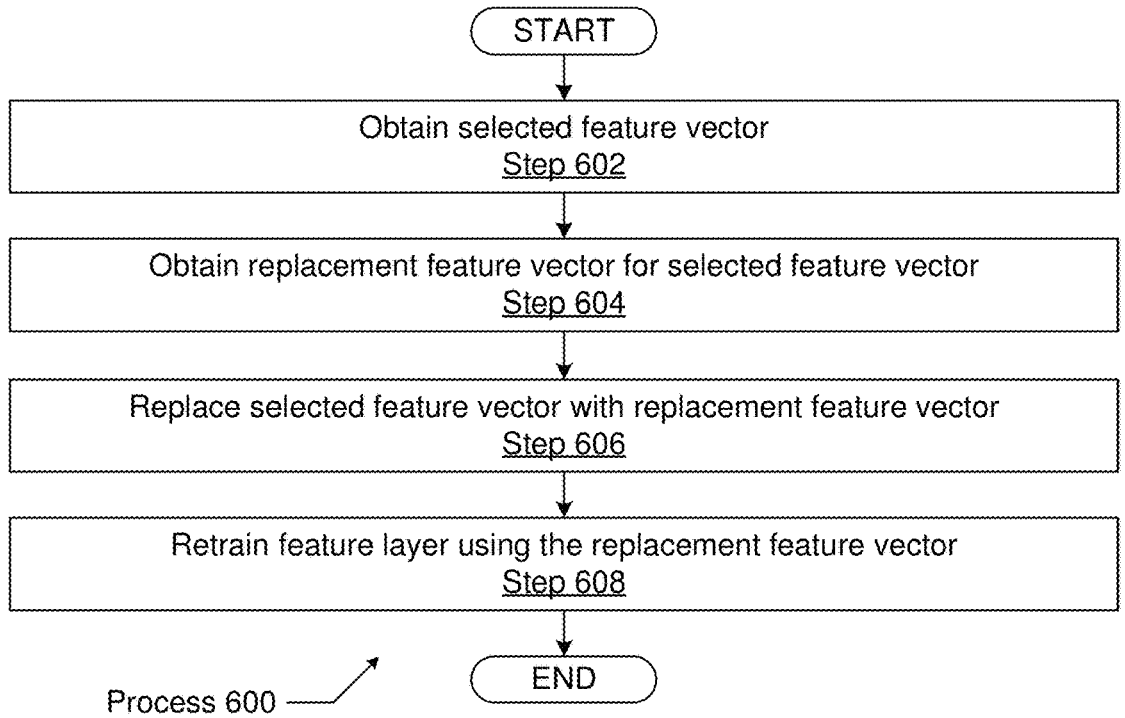

FIG. 6 shows a flowchart of the process (600) in accordance with one or more embodiments of the disclosure for updating feature extraction. While the various blocks in the flowchart are presented and described sequentially, one of ordinary skill will appreciate that at least some of the blocks may be executed in different orders, may be combined or omitted, and at least some of the blocks may be executed in parallel. Furthermore, the blocks may be performed actively or passively. For example, some blocks may be performed using polling or be interrupt driven in accordance with one or more embodiments. By way of an example, determination blocks may not have a processor process an instruction unless an interrupt is received to signify that condition exists in accordance with one or more embodiments. As another example, determinations may be performed by performing a test, such as checking a data value to test whether the value is consistent with the tested condition in accordance with one or more embodiments.

In Step 602, a selected feature vector is obtained. In one or more embodiments, the selected feature vector is obtained in response to interaction with a user of the system. For example, the elements from the content are displayed with corresponding feature vectors that were extracted from the content. The user may select one or more of the feature vectors with a graphical user interface. In response to the selection of the feature vector, the client device executing the graphical user interface may transmit the selected feature vector to the server, which receives the selected feature vector.

In Step 604, a replacement feature vector for the selected feature vector is obtained. In one or more embodiments, the selected replacement vector is obtained in response to interaction with a user of the system. For example, after selecting a feature vector with the graphical user interface, the user may select the replacement vector by editing the values of the dimensions of the selected feature vector to create the replacement feature vector from an edited version of the selected feature vector. In response to creating the replacement feature vector, the client device executing the graphical user interface may transmit the replacement feature vector to the server, which receives the replacement feature vector.

In Step 606, the selected feature vector is replaced with the replacement feature vector. In one or more embodiments, a server application that receives the replacement feature vector updates a repository of training data to include the element and the replacement feature vector. In one or more embodiments, replacement of the selected feature vector by the replacement feature vector is in response to a message received from a client device that identifies the selected feature vector and includes at least the values from the replacement feature vector that are different from the selected feature vector In Step 608, the feature layer is retrained using the replacement feature vector. In one or more embodiments, the feature layer of the modeling engine includes a machine learning algorithm, such as a neural network, that uses backpropagation to improve the results of the feature layer. The feature layer is then trained with the element and replacement feature vector pair to improve the likelihood of extracting the correct feature vector from content that includes the element. For example, the element may be provided as an input to the feature layer, which outputs a feature vector. The output feature vector is then compared to the replacement feature vector and the difference (identified with a loss function) is backpropagated through the feature layer to update the weights of the feature layer and improve the likelihood that the feature layer will correctly identify the element. In one or more embodiments, retraining of the feature layer of the modeling engine is triggered in response to a message received from a client device.

Figure 7:
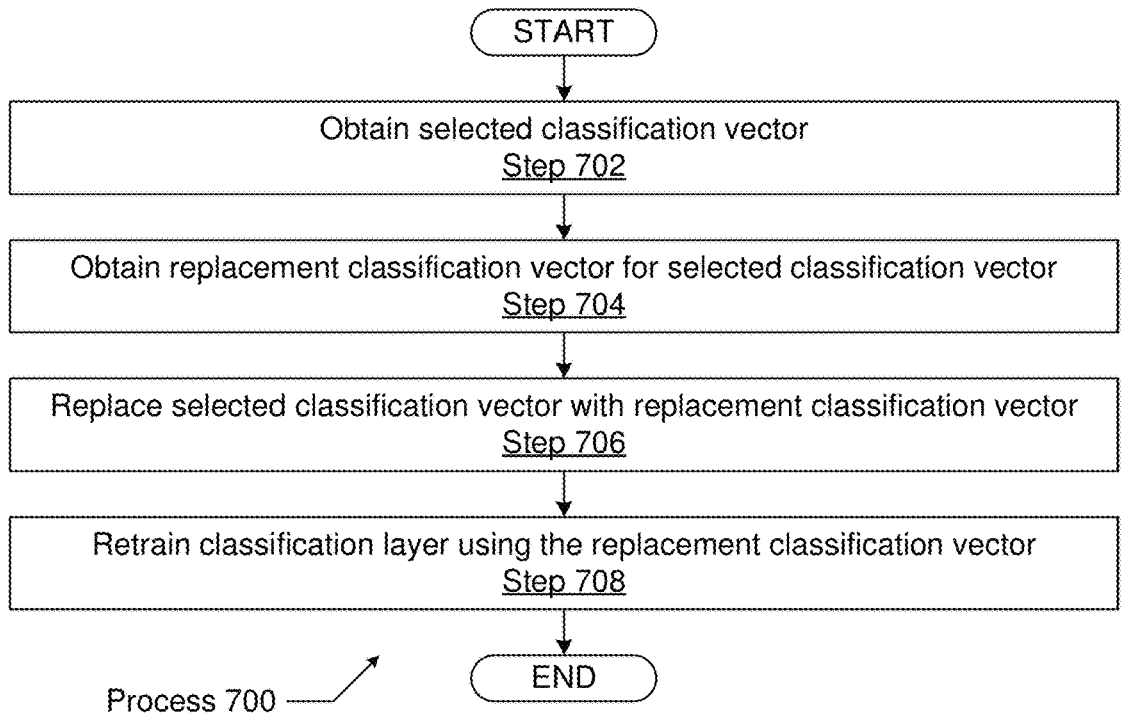

FIG. 7 shows a flowchart of the process (700) in accordance with one or more embodiments of the disclosure for updating classification layers. While the various blocks in the flowchart are presented and described sequentially, one of ordinary skill will appreciate that at least some of the blocks may be executed in different orders, may be combined or omitted, and at least some of the blocks may be executed in parallel. Furthermore, the blocks may be performed actively or passively. For example, some blocks may be performed using polling or be interrupt driven in accordance with one or more embodiments. By way of an example, determination blocks may not have a processor process an instruction unless an interrupt is received to signify that condition exists in accordance with one or more embodiments. As another example, determinations may be performed by performing a test, such as checking a data value to test whether the value is consistent with the tested condition in accordance with one or more embodiments.

In Step 702, a selected classification vector is obtained. In one or more embodiments, the selected classification vector is obtained in response to interaction with a user of the system. For example, the elements from the content are displayed with corresponding classification vectors that were generated from the feature vectors extracted from the content. The user may select one or more of the classification vectors with a graphical user interface. In response to the selection of the classification vector, the client device executing the graphical user interface may transmit the selected classification vector to the server, which receives the selected classification vector.

In Step 704, a replacement classification vector for the selected classification vector is obtained. In one or more embodiments, the selected replacement vector is obtained in response to interaction with a user of the system. For example, after selecting a classification vector with the graphical user interface, the user may select the replacement vector by editing the values of the dimensions of the selected classification vector to create the replacement classification vector from an edited version of the selected classification vector. In response to creating the replacement classification vector, the client device executing the graphical user interface may transmit the replacement classification vector to the server, which receives the replacement classification vector.

In Step 706, the selected classification vector is replaced with the replacement classification vector. In one or more embodiments, a server application that receives the replacement classification vector updates a repository of training data to include the element, the feature vector extracted for the element, and the replacement classification vector. In one or more embodiments, replacement of the selected classification vector by the replacement classification vector is in response to a message received from a client device that identifies the selected classification vector and includes at least the values from the replacement classification vector that are different from the selected classification vector.

In Step 708, the classification layer is retrained using the replacement classification vector. In one or more embodiments, the classification layer includes a machine learning algorithm, such as a neural network, that uses backpropagation to improve the results of the classification layer. The classification layer is then trained with a set of data that includes the replacement classification vector and one or more of the element and the extracted feature vector for the element to improve the likelihood of extracting the correct classification vector from one or more of the element and the feature vector. For example, the feature vector may be provided as an input to the classification layer, which outputs a classification vector. The output classification vector is then compared to the replacement classification vector and the difference (identified with a loss function) is backpropagated through the classification layer to update the weights of the classification layer and improve the likelihood that the classification layer will correctly identify the element and feature vector. In one or more embodiments, retraining of classification layer of the modeling engine is triggered in response to a message received from a client device.

Figure 8:
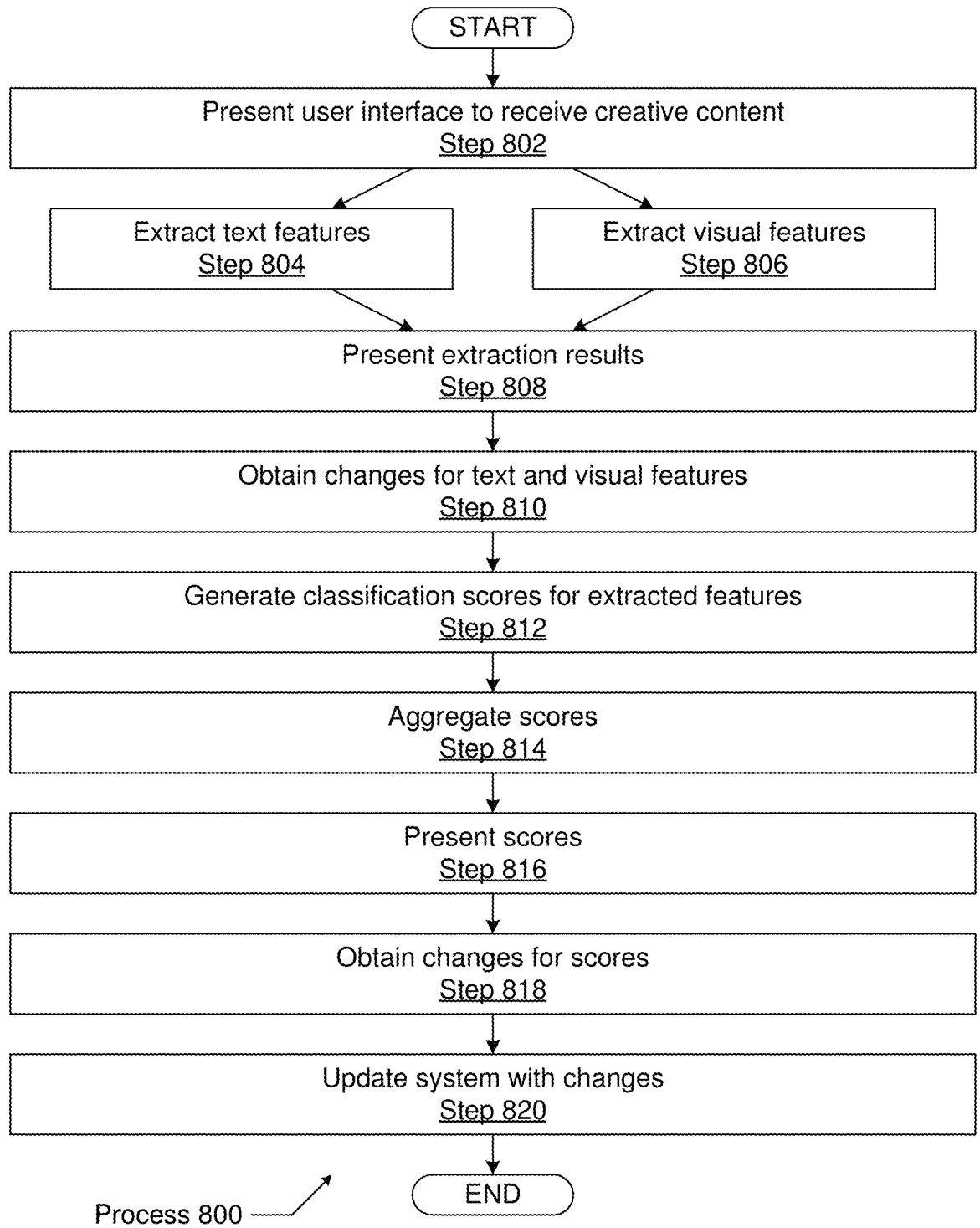

FIG. 8 shows a flowchart of the process (800) in accordance with one or more embodiments of the disclosure for classification using scoring. While the various blocks in the flowchart are presented and described sequentially, one of ordinary skill will appreciate that at least some of the blocks may be executed in different orders, may be combined or omitted, and at least some of the blocks may be executed in parallel. Furthermore, the blocks may be performed actively or passively. For example, some blocks may be performed using polling or be interrupt driven in accordance with one or more embodiments. By way of an example, determination blocks may not have a processor process an instruction unless an interrupt is received to signify that condition exists in accordance with one or more embodiments. As another example, determinations may be performed by performing a test, such as checking a data value to test whether the value is consistent with the tested condition in accordance with one or more embodiments.

In Step 802, a user interface is presented to receive creative content. In one or more embodiments, the user interface is a graphical user interface of an application operating on a client device. In one or more embodiments, the application is a web browser communicating with a server that hosts a web page viewed with the web browser. The creative content may be received by dragging and dropping an image file into the web browser and by specifying a file and path name or a uniform resource locator (URL) that identifies the location of the file.

In Step 804, text features are extracted. In one or more embodiments, text features are extracted by using an optical character recognition service to recognize the text from the content. After recognizing the text, the system may further process the text to identify words and phrases that are encoded into one or text feature vectors that identify the meaning of the words and phrases from the recognized text. In one or more embodiments, conversion from the recognized text to the text feature vectors is performed using one or more machine learning algorithms, which may include neural networks with LSTMs and fully connected layers.

In Step 806, visual features are extracted. In one or more embodiments, visual features are extracted by using an image recognition service to recognize the visual elements within the content. A feature layer that generates feature vectors from the content may perform an initial pass to identify the location of elements within the content. After identifying the location of elements within the content, the feature layer may then generate feature vectors from the elements that were located in the content.

In Step 808, extraction results are presented. In one or more embodiments, the extraction results are presented by displaying one or more of the content, elements, and feature vectors in the graphical user interface executing on the client device.

In Step 810, changes for text and visual features are obtained. In one or more embodiments, a user of the system interacts with the graphical user interface to select one or more text features and visual features that are to be adjusted. The user may then create the changes by editing the values of the feature vectors of the text features and the visual features for the elements from the content.

In Step 812, classification scores for the extracted features are generated. In one or more embodiments, the classification scores are generated as classification vectors from the feature vectors that were extracted from the content. The classification scores identify the characteristics of the elements of the content. In one or more embodiments, the classification scores are generated by a server and transmitted to the client device.

In Step 814, the scores are aggregated. In one or more embodiments, the classification scores are aggregated by combining the classification vectors into an aggregated vector. In one or more embodiments, the aggregated vector is generated by a server and transmitted to the client device.

In Step 816, scores are presented. One or more embodiments, the scores are presented by displaying one or more of the feature vectors, the classification vectors, and the aggregated vector with the graphical user interface on the client device.

In Step 818, changes for the scores are obtained. In one or more embodiments, the user interacts with the graphical user interface to select one or more of the scores. The user may then create the changes by editing the values of the dimensions of the classification vectors with the graphical user interface.

In Step 820, the system is updated with changes. In one or more embodiments, a modeling engine that generates the feature vectors and the classification vectors is updated with the changes obtained from the user with the graphical user interface. In one or more embodiments, the modeling engine uses backpropagation to update the models and layers within the modeling engine.

Figure 9:
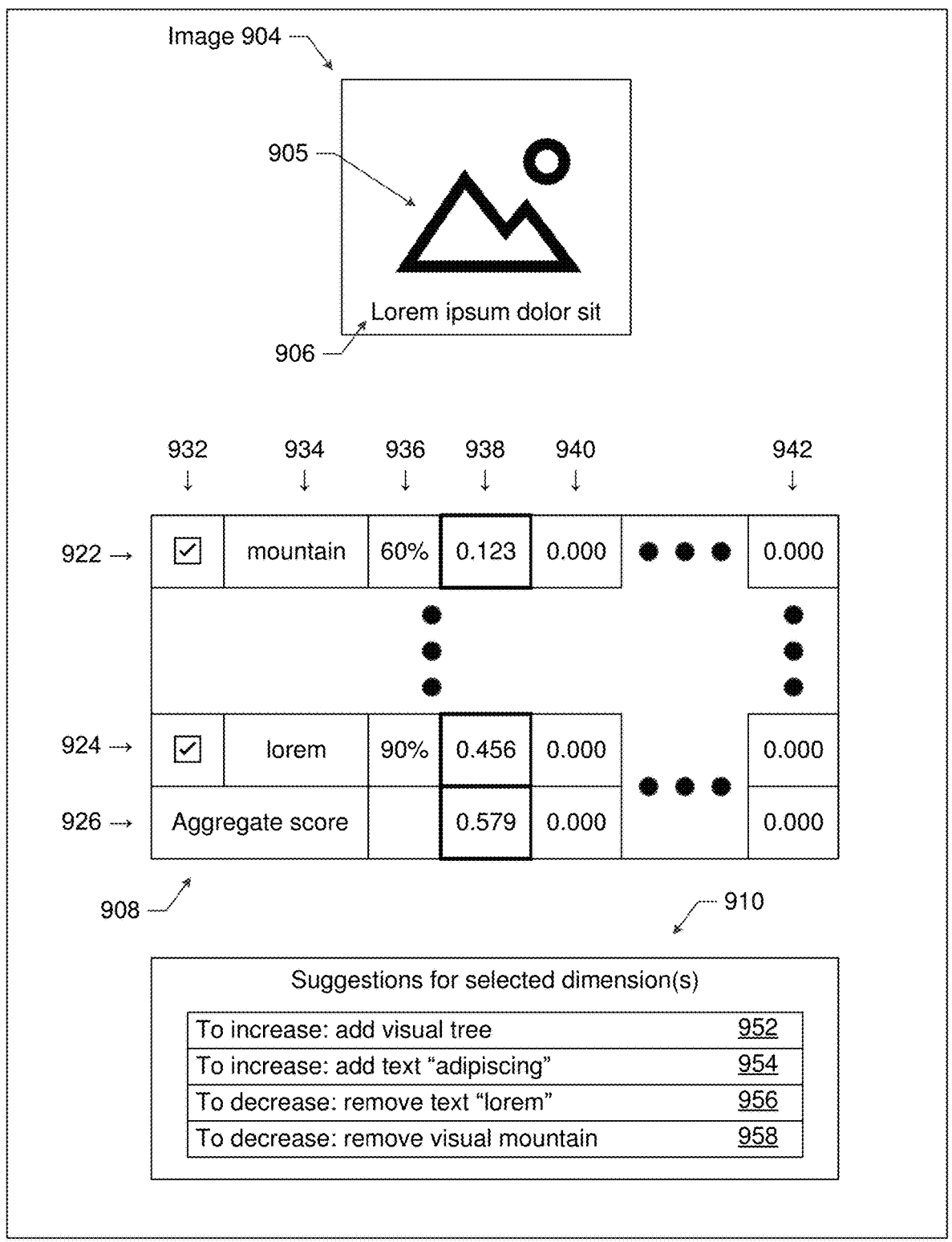
FIG. 9, FIG. 10, FIG. 11, FIG. 12, and FIG. 13 shows example user interfaces in accordance with disclosed embodiments.

FIG. 9 shows a diagram of the user interface (902) in accordance with the disclosure. The various elements, widgets, and components shown in FIG. 9 may be omitted, repeated, combined, and/or altered as shown from FIG. 9. Accordingly, the scope of the present disclosure should not be considered limited to the specific arrangements shown in FIG. 9.

The user interface (902) is a graphical user interface that includes multiple user interface elements for a user to interact with the system to specify visual content, present vectors, and present suggestions. The user interface elements include the image (904), the table (908), and the suggestion window (910).

The image (904) is a creative content (also referred to as "content" or "creative") that includes one or more text elements and visual elements and is located above the table (908). The image (904) includes the visual element (905) and the text element (906). The visual element (905) includes a depiction of a mountain. The text element (906) includes a phrase of text that is embedded within the image (904). In one or more embodiments, the user may edit the image (904) by adding or removing text features and visual features from the image (904) through the user interface (902).

The table (908) is located between the image (904) and the suggestion window (910). The table (908) presents a collection of information generated from the image (904). The table (908) includes the rows (922) through (926) and the columns (932) through (942). Changes to the feature vectors and classification vectors may be received by editing the values in the cells at the rows (922) through (924) and the columns (934) through (942). For example, a user may edit one or more of the values of "mountain", "60%", and "0.123" to respectively be "rooftop", "100%", and "1.000" and the system will accordingly change the feature vectors and classification vectors to match the changes created by the user and may retrain the modeling engine used to generate the vectors. The values in the cells of the table (908) may be continuously updated in response to changes to the image (904).

The rows (922) through (924) identify the elements found within the image (904) and present the vectors and descriptions of the elements. The row (926) is an a aggregate row that combines the scores of the classification vectors from the rows (922) through (924) and presents an aggregated vector. In one or more embodiments, the row (926) combines the classification vectors from the rows (922) through (924) by adding the classification vectors together.

The column (932) includes check boxes for the rows (922) through (924) to control when the classification vector of a row is included in the calculation of the aggregated vector presented in the row (926). The column (934) includes descriptions for the elements of the rows (922) through (924). The column (936) identifies an accuracy of the feature extraction for the elements of the rows (922) through (924).

The columns (938) through (942) are the dimensions of the classification vectors for the elements of the rows (922) through (924). The column (938) is highlighted with a thicker border to indicate that the dimension of the classification vector that corresponds to the column (938) has been selected by the user as a dimension to be adjusted by adding and removing elements. Responsive to the selection of the column (938) as the selected column, the suggestion window (910) presents the suggestions to increase or decrease the value of the selected dimension in the aggregated vector for the aggregated score generated for the image (904).

The row (922) provides information about the element (905) from the image (904). The cell at the row (922) and the column (932) indicates that the classification vector for the element (905) is included in the aggregated score presented in the row (926). The cell at the row (922) and the column (934) indicates that the element (905) is identified as a mountain with a feature vector. The cell at the row (922) and the column (936) indicates that the identification of the element (905) as a mountain has an accuracy of 60%, which is determined from the feature vector generated from the element (905). The cells at the row (922) and the columns (938) through (942) contain the values of the classification vector generated from the element (905).

The row (924) provides information about the element (906) from the image (904). The cell at the row (924) and the column (932) indicates that the classification vector for the element (906) is included in the aggregated score presented in the row (926). The cell at the row (924) and the column (934) indicates that the element (906) includes the word "lorem", which is identified with a text feature vector. The cell at the row (924) and the column (936) indicates that the identification of the text feature from the element (906) has an accuracy of 90%. The cells at the row (924) and the columns (938) through (942) contain the values of the classification vector generated from the text feature "lorem" from the element (906) of the image (904).

The suggestion window (910) is located below the table (908) and presents the suggestions (952) through (958). The suggestions (952) to (958) identify elements that may be added to or removed from the image (904) to adjust the characteristics that correspond to the selected column (938) and a presented in response to the selection of one or more of the columns (938) through (942) in the table (908).

The suggestion (952) indicates that adding a visual element of a tree will increase the value of the selected dimension in the cell at the row (926) and the column (938). The suggestion (954) indicates that adding a text element, i.e., the word "adipiscing" will increase the value of the selected dimension. The suggestion (956) indicates that removing the word "lorem" from the text element (906) will decrease the value of the selected dimension. The suggestion (958) indicates that removing the mountain visual element (905) will decrease the value of the selected dimension. In one or more embodiments, the suggestions (952) through (958) in the suggestion window (910) are continuously updated in response to changes to the table (908) and to changes made to the image (904). For example, the suggestion window (910) may updated when different ones of the columns (938) through (942) are selected and when the elements (905) and (906) are removed from the image (904).

Figure 10:
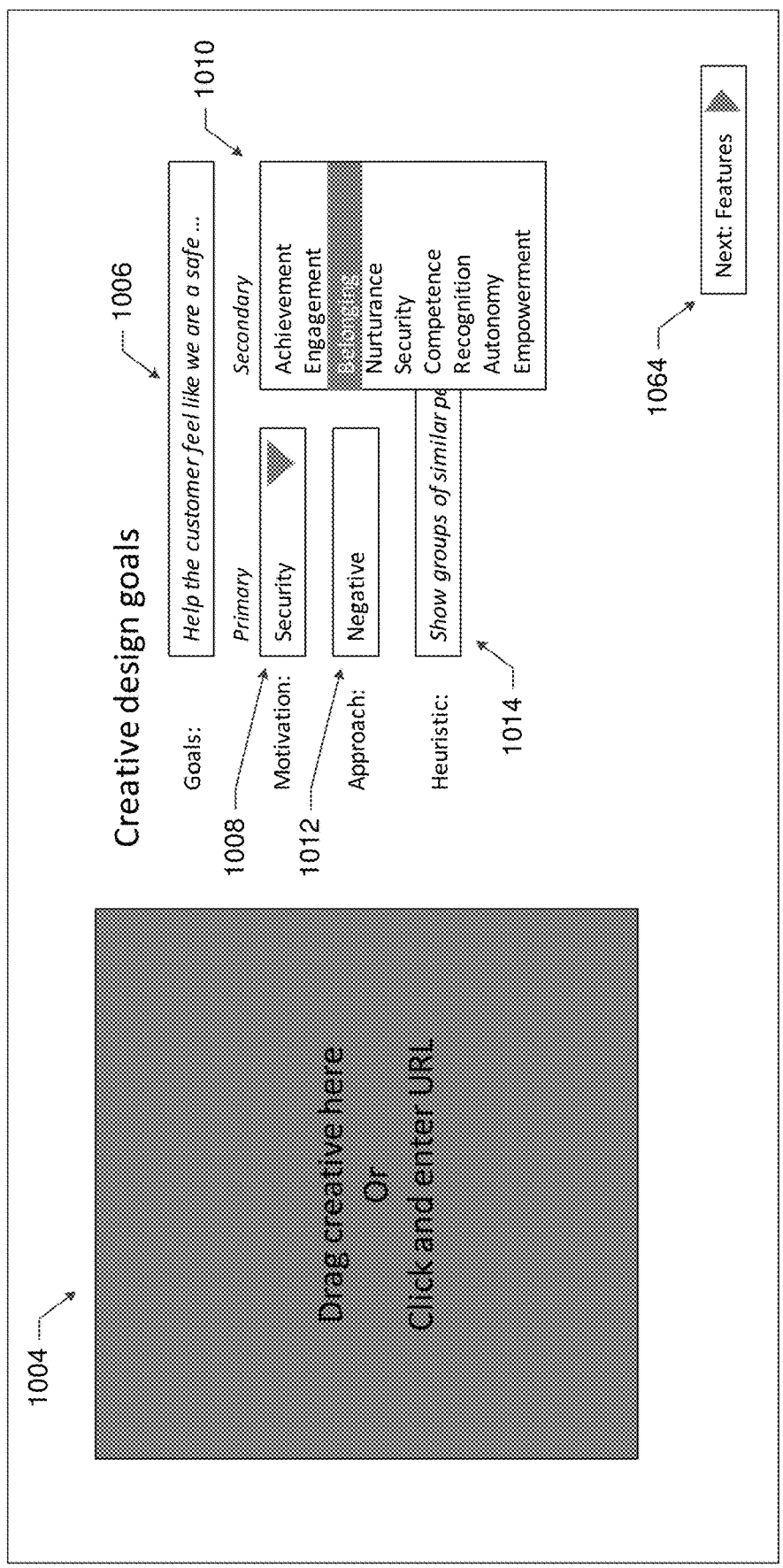

FIG. 10 shows a diagram of the user interface (1002) in accordance with the disclosure. The various elements, widgets, and components shown in FIG. 10 may be omitted, repeated, combined, and/or altered as shown from FIG. 10. Accordingly, the scope of the present disclosure should not be considered limited to the specific arrangements shown in FIG. 10.

The user interface (1002) is a graphical user interface that includes multiple user interface components for a user to interact with the system to specify visual content. The user interface components include the components (1004) through (1064).

The component (1004) is a content selection component that is used to identify and display an image as the creative content to be analyzed by the system. The content identified by the component (1004) may be selected by dragging and dropping the file containing the content on to the component (1004), which, in response, may load and display the content within the component (1004). Additionally, clicking on the component (1004) may open a dialog window to specify the file and path name or the uniform resource locator (URL) that identifies the location of the content, which may then be loaded and displayed by the component (1004).

The component (1006) is a goal identification component that is used to identify a target goal that will be compared with the detected goal that is generated from the content. The target goal may be used to determine one or more suggestions for updating the content. The target goal may be similar to the detected goal that is detected from the content identified with the component (1004). In one or more embodiments, the component (1006) is an edit box and the target goal is specified as a string of text with the edit box.

The component (1008) is a primary motivation identification component that identifies a primary target motivation for the content. In one or more embodiments, one of the nine motivations, as described above, may be selected as the primary target motivation. The primary target motivation is associated with one or more of the dimensions of the aggregated vector and the classification vectors that are generated from the content identified with the component (1004). In one or more embodiments, the component (1008) is a list box component. As an example, the primary target motivation selected with the component (1008) is the motivation of security.

The component (1010) is a secondary motivation identification component that identifies a secondary target motivation for the content. The secondary target motivation is associated with one or more of the dimensions of the aggregated vector and the classification vectors that are generated from the content identified with the component (1004). In one or more embodiments, the component (1010) is a list box. The component (1010) has been selected to reveal a listing of the possible motivations: "Achievement", "Engagement", "Belonging", "Nurturance", "Security", "Competence", "Recognition", "Autonomy", and "Empowerment", of which the motivation of "Belonging" is selected.

The component (1012) is a primary approach identification component that identifies a primary target approach for the content identified with the component (1004). The primary target approach maybe one of the two approaches discussed above. The primary target approach is associated with one or more of the dimensions of the aggregated vector and the classification vectors that are generated from the content with the component (1004). Selection of the primary target approach identifies an approach that should be present within the classification vectors and the aggregated vector generated from the content. In one or more embodiments, the component (1012) is a list box for selecting between the different approach dimensions, which may be one of a positive approach and a negative approach. The approach selected with the component (1012) is a negative approach.

A component for a secondary approach identification component to identify a secondary target approach may also be included with the user interface (1002). The location of the secondary approach identification component is covered by the list from the component (1010) for selecting the secondary target motivation.

The component (1014) is a target heuristic component that identifies a target heuristic for the content identified with the component (1004). In one or more embodiments, the component (1014) is an edit box that accepts a text string input by the user of the system. As an example, the component (1014) includes the string "Show groups of similar people", to tie the targeted cognitive heuristic of the "identifiable victim effect" to the content.

The component (1064) is a button component that, upon selection, transitions the user interface (1002) to a next view. In one or more embodiments, the user interface (1002) is transitioned from the current view to the view from the user interface (1102) from FIG. 11.

Figure 11:
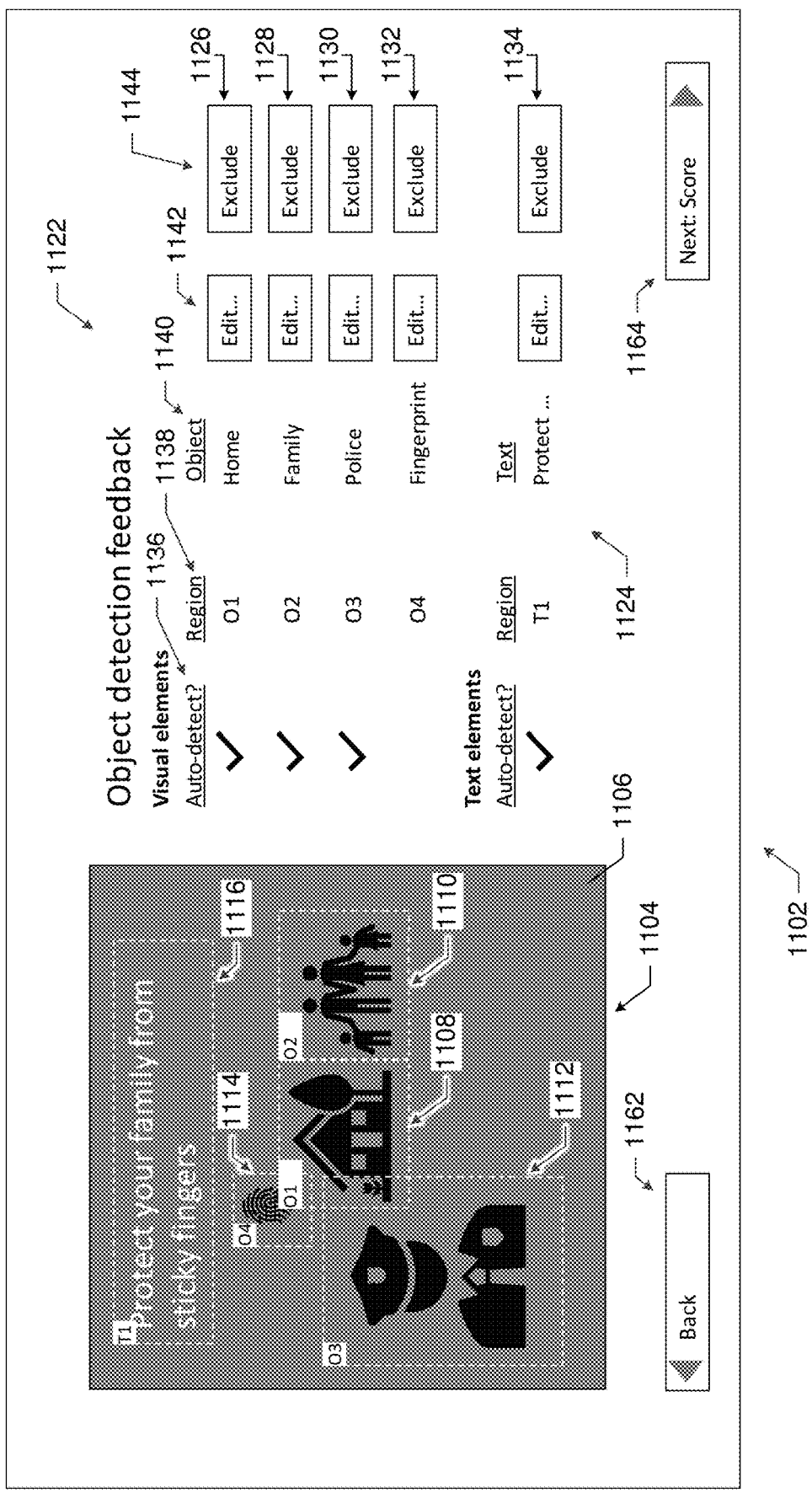

FIG. 11 shows a diagram of the user interface (1102) in accordance with the disclosure. The various elements, widgets, and components shown in FIG. 11 may be omitted, repeated, combined, and/or altered as shown from FIG. 11. Accordingly, the scope of the present disclosure should not be considered limited to the specific arrangements shown in FIG. 11.

The user interface (1102) is a graphical user interface that includes multiple user interface components for a user to interact with the system to review and edit elements, features, and feature vectors. The user interface components include the components (1104) through (1164).

The component (1104) is a content identification component that identifies and labels the elements that are detected within the content (1106). In one or more embodiments, the content (1106) is an image created by a user of the system that includes the elements (1108) through (1116).

The element (1108) is a visual element that is an image of a home and is identified with the label "O1". The element (1110) is a visual element that is an image of a family and is identified with the label "O2". The element (1112) is a visual element that is an image of a police officer and is identified with the label "O3". The element (1114) is a visual element that is an image of a fingerprint and is identified with the label "O4". The element (1116) is a text element that includes the string "Protect your family from sticky fingers" and is identified with the label "T1". The elements (1108) through (1116) are surrounded by dotted line boxes to indicate the area and location of the elements (1108) through (1116). The boxes surrounding the elements (1108) through (1116) include the labels in the upper left-hand to identify the elements (1108) through (1116).

The area (1122) is an area within the user interface (1102) that describes the visual elements (1108) through (1114) within the content (1106) and includes the rows (1126) through (1132). The area (1124) is an area within the user interface (1102) that describes the text element (1116) within the content (1106) and includes the row (1134). The areas (1122) and (1124) include the columns (1136) through (1144).

The columns (1136) through (1144) align the information about the elements (1108) through (1116) that is presented in the rows (1126) through (1134). The column (1136) identifies elements that have been automatically detected from the content (1106). The column (1138) identifies the regions of the elements (1108) through (1116) by the labels overlaid on to the content (1106). The column (1140) identifies the features (objects and text) found within the elements (1108) through (1116) that are detected using the feature vectors generated from the content (1106). The column (1142) provides a set of edit buttons that, when selected, bring up a dialogue to change the values in one or more of the columns (1138) and (1140) for the elements (1108) through (1116). The column (1144) includes a set of exclude buttons that, when selected, may exclude an element from being subject to further analysis and be excluded from the subsequent views. For example, elements that have been excluded may not have their classification vectors displayed or combined as part of the aggregated vector generated from the content (1106).

The rows (1126) through (1134) include information derived from the content (1106) for the elements (1108) through (1116). For the row (1126): the check mark in the column (1136) indicates that the element (1108) was automatically detected by the system; the label "O1" in the column (1138) identifies the label that is overlaid on to the area of the element (1108) in the content (1106); the text "Home" in the column (1140) indicates that the element (1108) is a depiction of a home; selection of the edit button in the column (1142) allows for editing the values in the columns (1138) and the column (1140) by, for example, bring up a window for changing the values or by changing the cells of the columns (1138) and (1140) to user editable cells; and selecting the exclude button in the column (1144) will prevent further analysis of the element (1108). In one or more embodiments, preventing further analysis of the element (1108) would prevent a classification vector from being generated for the element (1108) and prevent the aggregated vector that is generated for the content (1106) from including the characteristics from the element (1108).

For the row (1132), the column (1136) does not include a check mark. The lack of the check mark in the column (1136) for the row (1132) indicates that the element (1114) in the region labeled "O4" was not automatically detected with the system. In one or more embodiments, the row (1132) is added by a user that identifies the element (1114).

For the row (1134), the column (1140) identifies the text feature from the element (1116). In one or more embodiments, the text feature from the element (1116) includes all of the words ("Protect your family from sticky fingers") from the element (1116).

The component (1162) is a button that, upon selection, transitions the user interface (1102) to a previous view. In one or more embodiments, the user interface (1102) is transitioned from the current view back to the view from the user interface (1002) from FIG. 10.

The component (1164) is a button that, upon selection, transitions the user interface (1102) to a next view. In one or more embodiments, the user interface (1102) is transitioned from the current view to the view from the user interface (1202) from FIG. 12.

Figure 12:
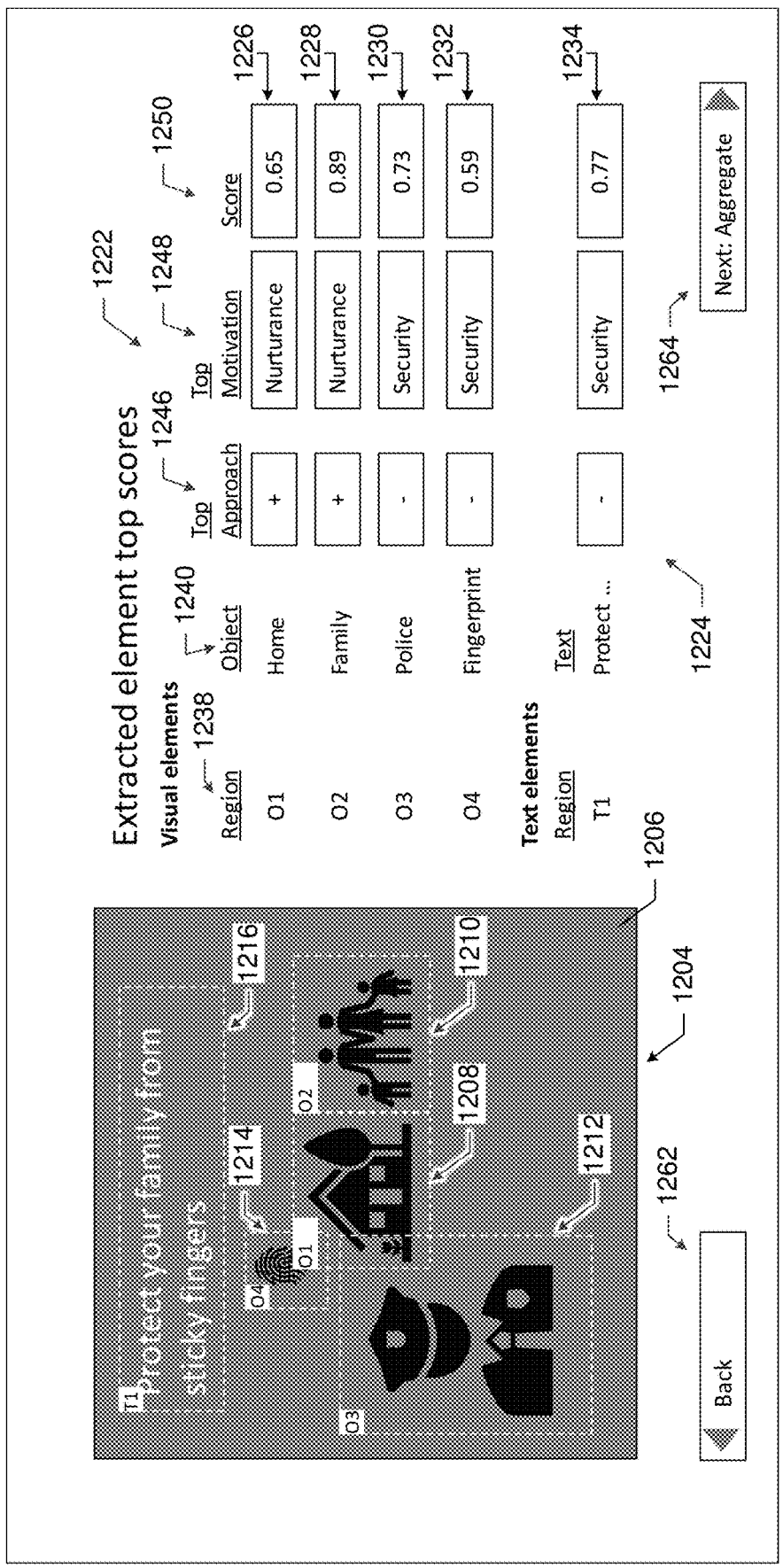

FIG. 12 shows a diagram of the user interface (1202) in accordance with the disclosure. The various elements, widgets, and components shown in FIG. 12 may be omitted, repeated, combined, and/or altered as shown from FIG. 12. Accordingly, the scope of the present disclosure should not be considered limited to the specific arrangements shown in FIG. 12.

The user interface (1202) is a graphical user interface that includes multiple user interface components for a user to interact with the system to review and edit characteristics and classification vectors generated from the content (1206). The user interface components include the components (1204) through (1264).

The component (1204) is a content display component that display the content (1206) and the elements (1208) through (1214). The elements (1208) through (1216) are surrounded by dotted line boundaries and include a label in the upper left corner.

The area (1222) is an area within the user interface (1202) that describes the characteristics of the visual elements (1208) through (1214) within the content (1206) and includes the rows (1226) through (1232). The area (1224) is an area within the user interface (1202) that describes the characteristics of the text element (1216) within the content (1206) and includes the row (1234). The areas (1222) and (1224) include the columns (1238), (1240), (1246), (1248), and (1250).

The columns (1238), (1240), (1246), (1248), and (1250) align the characteristics about the elements (1208) through (1216) that are presented in the rows (1226) through (1234). The column (1238) identifies the regions of the elements (1208) through (1216) by the labels overlaid on to the elements (1208) through (1216) in the content (1206). The column (1240) identifies the features (objects and text) found within the elements (1208) through (1216) that were detected from the content (1206).

In one or more embodiments, the information displayed in the columns (1246), (1248), and (1250) is from the classification vectors that are generated from the feature vectors that were extracted from the content (1206) for the elements (1208) through (1216). In one or more embodiments, the classification vectors include eighteen dimensions for nine motivation dimensions and two approach dimensions, as described above. The column (1246) identifies the approaches of the dimensions of the classification vectors that have the highest values for the elements (1208) through (1216), which is further described below. The column (1248) identifies the motivations of the dimensions of the classification vectors that have the highest values for the elements (1208) through (1216). The column (1250) identifies the scores of the classification vectors that have the highest values for the elements (1208) through (1216).

In one or more embodiments, the columns (1246), (1248), and (1250) include edit boxes. The edit boxes in the columns (1246), (1248), and (1250) may be responsive to user input to change the approaches, motivations, and scores of the classification vectors that are generated from the content (1206).

The rows (1226) through (1234) identify the characteristics derived from the content (1206) for the elements (1208) through (1216). For the row (1226), the label "O1" in the column (1238) identifies the label that is overlaid on to the area of the element (1208); the text "Home" in the column (1240) indicates that the element (1208) is a depiction of a home; the "+" symbol in the column (1246) indicates that for the dimension with the highest value for the classification vector generated from the element (1208), the approach is a positive approach; the column (1248) indicates that the motivation for the dimension with the highest value for the classification vector generated from the element (1208) is the motivation of "Nurturance"; the column (1250) identifies the score for the element (1208) as "0.65", which is the value from the dimension of the classification vector that corresponds to the motivation and approach pair of a nurturance motivation and a positive approach.

For the row (1230), the column (1250) indicates that the element (1212) has a top score of "0.73" for the classification vector generated for the element (1212). The columns (1246) and (1248) indicate that the score of "0.73" is in the dimension of the classification vector that corresponds to a security motivation and a negative approach in the classification vector.

The component (1262) is a button that, upon selection, transitions the user interface (1202) to a previous view. In one or more embodiments, the user interface (1202) is transitioned from the current view back to the view from the user interface (1102) from FIG. 11.

The component (1264) is a button that, upon selection, transitions the user interface (1202) to a next view. In one or more embodiments, the user interface (1202) is transitioned from the current view to the view from the user interface (1302) from FIG. 13. In one or more embodiments, when the button (1264) is pressed and the information in one or more of the rows 1226 through 1234 have been edited a retraining of the system may be triggered with edited information returned as a vector and fed back to the modeling engine.

Figure 13:
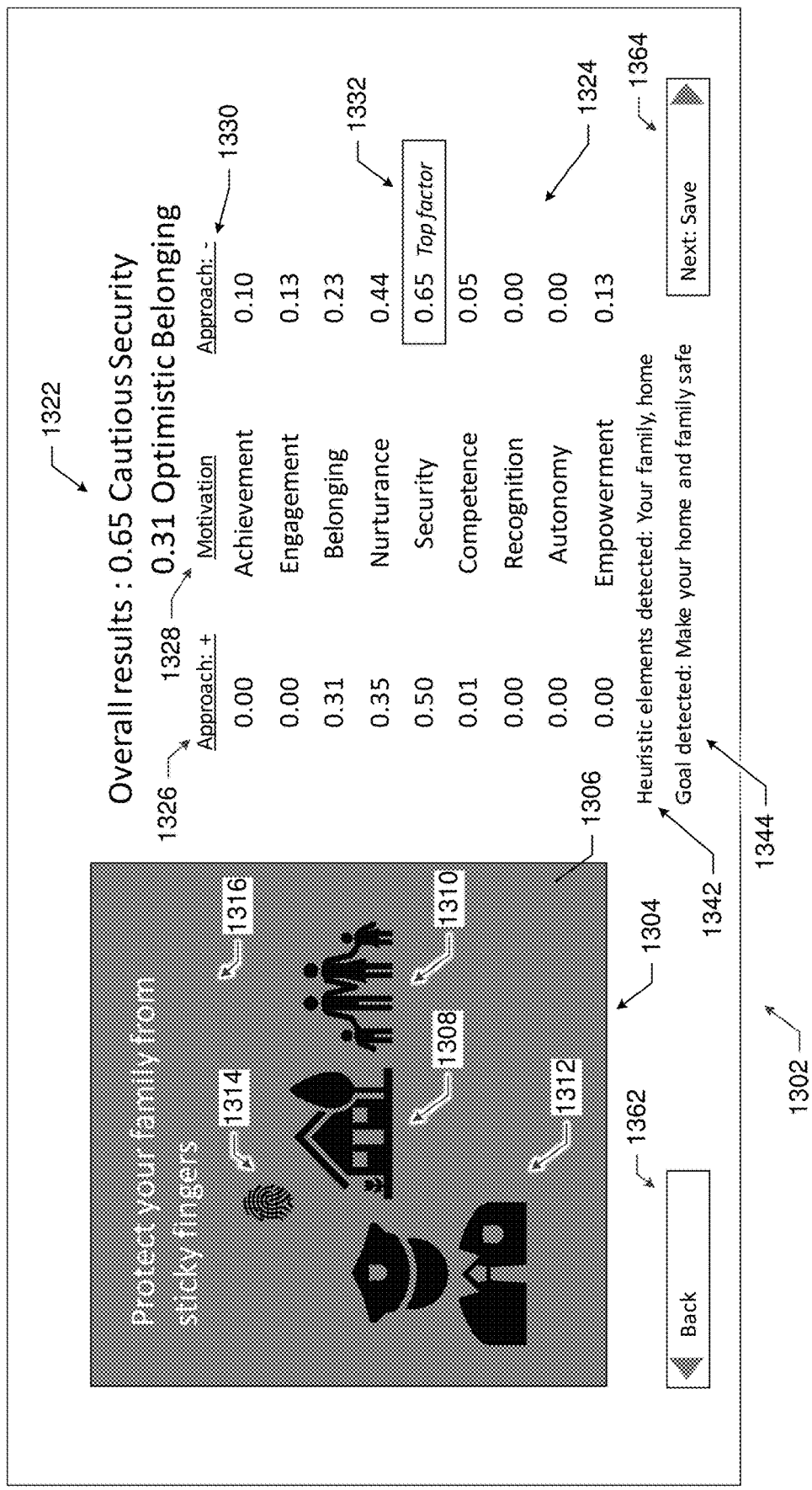

FIG. 13 shows a diagram of the user interface (1302) in accordance with the disclosure. The various elements, widgets, and components shown in FIG. 13 may be omitted, repeated, combined, and/or altered as shown from FIG. 13. Accordingly, the scope of the present disclosure should not be considered limited to the specific arrangements shown in FIG. 13.

The user interface (1302) is a graphical user interface that includes multiple user interface components for a user to interact with the system to review the aggregated vector generated from the content (1306). The user interface components include the components (1304) through (1364).

The component (1304) is a content display component that displays the content (1306). The content includes the elements (1308) through (1316). As discussed above, the content (1306) and the elements (1308) through (1316) are used to generate the feature vectors, the classification vectors, and aggregated vector to identify the characteristics of the content (1306).

The area (1322) is an area within the user interface (1302) that displays the dimensions of the aggregated vector that have the highest scores. For example, the dimension with the highest score of "0.65" from the aggregated vector generated from the content (1306) is identified as the dimension of "Cautious Security", which corresponds to the motivation approach pair of a security motivation with a negative approach and is located in the fifth row of the table (1324), and in which the negative approach is greater than the positive approach for the same motivation. Furthering the example, the dimension with the next highest score, a different motivation, and a different approach is identified as having a score of "0.31" and is for the dimension of "Optimistic Belonging", which corresponds to the motivation approach pair of a security motivation with a positive approach, is located in the third row of the table (1324), and in which the positive approach is greater than the negative approach for the same motivation.

The table (1324) below the area (1322) displays information from the eighteen dimensions from the aggregated vector generated for the content (1306). The table (1324) includes nine rows for the motivation dimensions from the aggregated vector, which are labeled with the column (1328). The column (1326) identifies the scores for the positive approaches paired with the motivations identified in the column (1328). The column (1330) identifies the scores for the negative approaches paired with the motivations identified in the column (1328). For example, first row of the table (1322) indicates that the motivation achievement pair of an achievement motivation with a positive approach has a score of "0.00" in the column (1326) and that the pair of an achievement motivation with a negative approach has a score of "0.10" from the column (1330). The cell (1332) is highlighted to identify the top factor with the highest score and value within the aggregated vector for the content (1306).

The component (1342) displays the detected heuristic elements that may be generated from one or more of the feature vectors, the classification vectors, and the aggregated vector that are generated from the content (1306). For example, the heuristic elements detected from the content (1306) include "Your family" and "home".

The component (1344) displays the detected goal that may be generated from one or more of the feature vectors, the classification vectors, and the aggregated vector that are generated from the content (1306). For example, the goal detected from the content (1306) is identified as the phrase "Make your home and family safe".

The component (1362) is a button that, upon selection, transitions the user interface (1302) to a previous view. In one or more embodiments, the user interface (1302) is transitioned from the current view back to the view from the user interface (1202) from FIG. 12.

The component (1364) is a button. Upon selection of the button (1364), the system may save the content (1306) and the analysis generated from the content (1306), including one or more of the feature vectors, the classification vectors, and the aggregated vector. In one or more embodiments, selection of the button (1364) triggers a process to retrain the modeling engine using the updates to the feature vectors and classification vectors made with the graphical user interface.

Embodiments may be implemented on a computing system. Any combination of mobile, desktop, server, router, switch, embedded device, or other types of hardware may be used. For example, as shown in FIG. 14A, the computing system (1400) may include one or more computer processors (1402), non-persistent storage (1404) (e.g., volatile memory, such as random access memory (RAM), cache memory), persistent storage (1406) (e.g., a hard disk, an optical drive such as a compact disk (CD) drive or digital versatile disk (DVD) drive, a flash memory, etc.), a communication interface (1412) (e.g., Bluetooth interface, infrared interface, network interface, optical interface, etc.), and numerous other elements and functionalities.

The computer processor(s) (1402) may be an integrated circuit for processing instructions. For example, the computer processor(s) may be one or more cores or micro-cores of a processor. The computing system (1400) may also include one or more input devices (1410), such as a touchscreen, keyboard, mouse, microphone, touchpad, electronic pen, or any other type of input device.

The communication interface (1412) may include an integrated circuit for connecting the computing system (1400) to a network (not shown) (e.g., a local area network (LAN), a wide area network (WAN) such as the Internet, mobile network, or any other type of network) and/or to another device, such as another computing device.

Further, the computing system (1400) may include one or more output devices (1408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1402), non-persistent storage (1404), and persistent storage (1406). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Figure 14A:
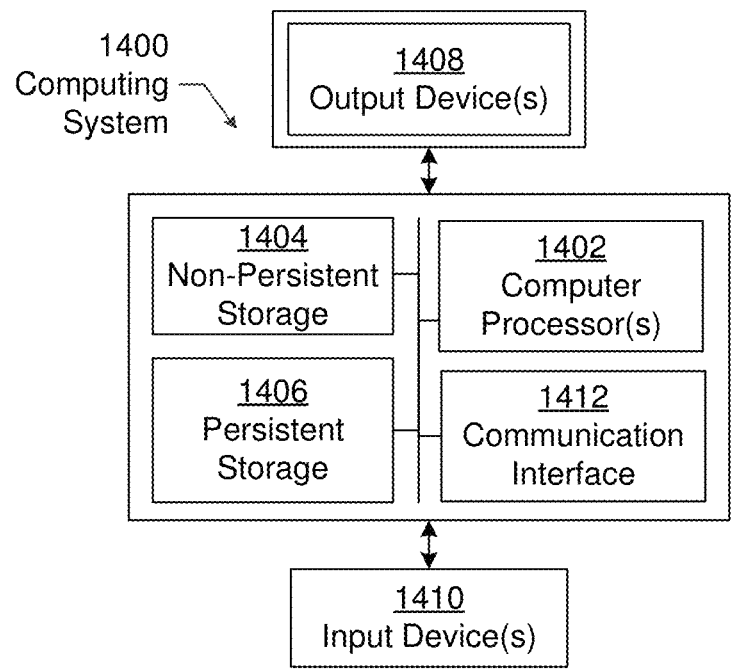
FIG. 14A and FIG. 14B show computing systems in accordance with disclosed embodiments.

The computing system (1400) in FIG. 14A may be connected to or be a part of a network. For example, as shown in FIG. 14B, the network (1420) may include multiple nodes (e.g., node X (1422), node Y (1424)). Nodes may correspond to a computing system, such as the computing system shown in FIG. 14A, or a group of nodes combined may correspond to the computing system shown in FIG. 14A. By way of an example, embodiments of the disclosure may be implemented on a node of a distributed system that is connected to other nodes. By way of another example, embodiments of the disclosure may be implemented on a distributed computing system having multiple nodes, where portions of the disclosure may be located on a different node within the distributed computing system. Further, one or more elements of the aforementioned computing system (1400) may be located at a remote location and connected to the other elements over a network.

Figure 14B:
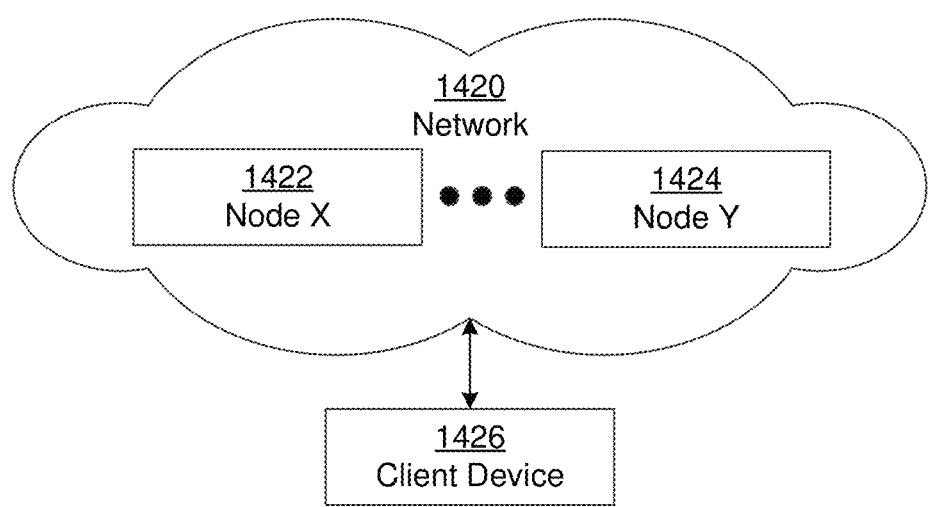

Although not shown in FIG. 14B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources. By way of another example, the node may correspond to a virtual server in a cloud-based provider and connect to other nodes via a virtual network.

The nodes (e.g., node X (1422), node Y (1424)) in the network (1420) may be configured to provide services for a client device (1426). For example, the nodes may be part of a cloud computing system. The nodes may include functionality to receive requests from the client device (1426) and transmit responses to the client device (1426). The client device (1426) may be a computing system, such as the computing system shown in FIG. 14A. Further, the client device (1426) may include and/or perform at least a portion of one or more embodiments of the disclosure.

The computing system or group of computing systems described in FIGS. 14A and 14B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object.

The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data which may include resending a response that in whole or in-part fulfilled an earlier request. Finally, the server process then generates a reply including at least the requested data and transmits the reply to the client process. The data may be transferred, more commonly, as datagrams or a stream of characters (e.g., bytes). The server and client may choose to use a unique identifier for each pair of request response data exchanges in order to keep track of data requests that may be fulfilled, partially fulfilled, or have been disrupted during computation.

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, camera, microphone, eye-tracker, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system in FIG. 14A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where tokens may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system.

For example, the computing system of FIG. 14A, while performing one or more embodiments of the disclosure, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 14A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 14A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 14A and the nodes and/or client device in FIG. 14B. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure. Accordingly, the scope of the disclosure should be limited only by the attached claims.

What is claimed is:

1. A method comprising:
   obtaining content comprising one or more elements;
   extracting one or more feature vectors from the content, wherein the one or more feature vectors comprise a feature vector that identifies an element of the one or more elements of the content;
   generating one or more classification vectors from the one or more feature vectors, wherein the one or more classification vectors comprise a classification vector that identifies one or more characteristics of the element from the content;
   combining the one or more classification vectors and identifying one or more characteristics of the content to form an aggregated vector;
   detecting a goal of the content by generating a string that describes the content from the aggregated vector;
   displaying the goal with the content;
   comparing the aggregated vector to a selected vector to identify a characteristic of the one or more characteristics of the content to update;
   identifying an element to add to the content to update the characteristic, of the one or more characteristics of the content, to increase a value of the characteristic, of the one or more characteristics of the content, from the aggregated vector; and
   identifying an element to remove from the content to update the characteristic, of the one or more characteristics of the content, to reduce the value of the characteristic, of the one or more characteristics of the content, from the aggregated vector.

2. The method of claim 1, further comprising:
   identifying a characteristic of the one or more characteristics of the element, of the one or more elements of the content, as a motivation being identified as one of achievement, autonomy, belonging, competence, empowerment, engagement, esteem, nurturance, and security with the classification vector; and
   identifying a characteristic of the one or more characteristics of the element, of the one or more elements of the content, as an approach being identified as one of actively achieving a positive outcome and avoiding a negative outcome with the classification vector.

3. The method of claim 1, further comprising:
   identifying a first characteristic of the one or more characteristics of the content as a motivation being identified as one of achievement, autonomy, belonging, competence, empowerment, engagement, esteem, nurturance, and security with the aggregated vector; and identifying a second characteristic of the one or more characteristics of the content as an approach being identified as one of actively achieving a positive outcome and avoiding a negative outcome with the aggregated vector.

4. The method of claim 1, further comprising:

forming an updated content using one or more of the element to add and the element to remove;

updating the one or more feature vectors, the one or more classification vectors, the aggregated vector, and the goal using the updated content to form one or more updated feature vectors, one or more updated the classification vectors, an updated aggregated vector, and an updated goal; and presenting the updated goal with the updated content.

5. The method of claim 1, further comprising:

obtaining a selected feature vector from the one or more feature vectors with a graphical user interface;

obtaining a replacement feature vector for the selected feature vector with the graphical user interface;

replacing the selected feature vector with the replacement feature vector; and retraining a feature layer using the replacement feature vector.

6. The method of claim 1, further comprising:

obtaining a selected classification vector from the one or more classification vectors with a graphical user interface;

obtaining a replacement classification vector for a selected classification vector from the one or more classification vectors with the graphical user interface;

replacing the selected classification vector with the replacement classification vector; and retraining a classification layer using the replacement classification vector.

7. A server system comprising:

a processor;

a memory coupled to the processor;

the memory comprising an application that executes on the processor, uses the memory, and is configured for:

obtaining content comprising one or more elements;

extracting one or more feature vectors from the content, wherein the one or more feature vectors comprise a feature vector identifying an element of the one or more elements of the content;

generating one or more classification vectors from the one or more feature vectors, wherein the one or more classification vectors comprise a classification vector that identifies one or more characteristics of the element from the content;

combining the one or more classification vectors and identifying one or more characteristics of the content to form an aggregated vector;

detecting a goal of the content by generating a string that describes the content from the aggregated vector;

displaying the goal with the content;

comparing the aggregated vector to a selected vector to identify a characteristic of the one or more characteristics of the content to update;

identifying an element to add to the content to update the characteristic, of the one or more characteristics of the content, to increase a value of the characteristic, of the one or more characteristics of the content, from the aggregated vector; and identifying an element to remove from the content to update the characteristic, of the one or more characteristics of the content, to reduce the value of the characteristic, of the one or more characteristics of the content, from the aggregated vector.

8. The system of claim 7 with the application further configured for:

identifying a characteristic of the one or more characteristics of the element, of the one or more elements of the content, as a motivation being identified as one of achievement, autonomy, belonging, competence, empowerment, engagement, esteem, nurturance, and security with the classification vector; and identifying a characteristic of the one or more characteristics of the element, of the one or more elements of the content, as an approach being identified as one of actively achieving a positive outcome and avoiding a negative outcome with the classification vector.

9. The system of claim 7 with the application further configured for:

identifying a first characteristic of the one or more characteristics of the content as a motivation being identified as one of achievement, autonomy, belonging, competence, empowerment, engagement, esteem, nurturance, and security with the aggregated vector; and identifying a second characteristic of the one or more characteristics of the content as an approach being identified as one of actively achieving a positive outcome and avoiding a negative outcome with the aggregated vector.

10. The system of claim 7 with the application further configured for:

forming an updated content using one or more of the element to add and the element to remove;

updating the one or more feature vectors, the one or more classification vectors, the aggregated vector, and the goal using the updated content to form one or more updated feature vectors, one or more updated the classification vectors, an updated aggregated vector, and an updated goal; and presenting the updated goal with the updated content.

11. The system of claim 7 with the application further configured for:

obtaining a selected feature vector from the one or more feature vectors with a graphical user interface;

obtaining a replacement feature vector for the selected feature vector with the graphical user interface;

replacing the selected feature vector with the replacement feature vector; and retraining a feature layer using the replacement feature vector.

12. The system of claim 7 with the application further configured for:

obtaining a selected classification vector from the one or more classification vectors with a graphical user interface;

obtaining a replacement classification vector for a selected classification vector from the one or more classification vectors with the graphical user interface;

replacing the selected classification vector with the replacement classification vector; and retraining a classification layer using the replacement classification vector.

13. A method executed with a client device comprising a graphical user interface, the method comprising:
- receiving, through the graphical user interface, content that comprises one or more elements;
- obtaining one or more feature vectors extracted from the content, wherein the one or more feature vectors comprise a feature vector identifying an element of the one or more elements of the content;
- obtaining one or more classification vectors generated from the one or more feature vectors, wherein the one or more classification vectors comprise a classification vector identifying one or more characteristics of the element from the content;
- obtaining an aggregated vector formed by combining the one or more classification vectors and identifying one or more characteristics of the content;
- obtaining a goal of the content detected by generating a string that describes the content from the aggregated vector;
- displaying the goal with the content;
- obtaining an identification of a characteristic of the one or more characteristics of the content to update by comparing the aggregated vector to a selected vector;
- displaying an element to add to the content to update the characteristic, of the one or more characteristics of the content, to increase a value of the characteristic, of the one or more characteristics of the content, from the aggregated vector; and
- displaying an element to remove from the content to update the characteristic, of the one or more characteristics of the content, to reduce the value of the characteristic, of the one or more characteristics of the content, from the aggregated vector.

14. The method of claim 13, further comprising:
- displaying a characteristic of the one or more characteristics of the element, of the one or more elements of the content, as a motivation being identified as one of achievement, autonomy, belonging, competence, empowerment, engagement, esteem, nurturance, and security with the classification vector; and
- displaying a characteristic of the one or more characteristics of the element, of the one or more elements of the content, as an approach being identified as one of actively achieving a positive outcome and avoiding a negative outcome with the classification vector.

15. The method of claim 13, further comprising:
- displaying a first characteristic of the one or more characteristics of the content as a motivation being identified as one of achievement, autonomy, belonging, competence, empowerment, engagement, esteem, nurturance, and security with the aggregated vector; and
- displaying a second characteristic of the one or more characteristics of the content as an approach being identified as one of actively achieving a positive outcome and avoiding a negative outcome with the aggregated vector.

16. The method of claim 13, further comprising:
- displaying an updated content formed using one or more of the element to add and the element to remove;
- obtaining the one or more feature vectors, the one or more classification vectors, the aggregated vector, and the goal that are updated using the updated content to form one or more updated feature vectors, one or more updated the classification vectors, an updated aggregated vector, and an updated goal; and
- displaying the updated goal with the updated content.

17. The method of claim 13, further comprising:
- receiving a selected feature vector from the one or more feature vectors with the graphical user interface;
- receiving a replacement feature vector for the selected feature vector with the graphical user interface;
- replacing the selected feature vector with the replacement feature vector; and
- retraining a feature layer using the replacement feature vector.

* * * * *